US006553875B1

(12) United States Patent
Miyano

(10) Patent No.: US 6,553,875 B1
(45) Date of Patent: Apr. 29, 2003

(54) MACHINE TOOL ASSEMBLY

(76) Inventor: Toshiharu (Tom) Miyano, 50 Dundee La., Barrington Hills, IL (US) 60010

( * ) Notice: Subject to any disclaimer, the term of this patent is extended or adjusted under 35 U.S.C. 154(b) by 148 days.

(21) Appl. No.: 09/633,545

(22) Filed: Aug. 7, 2000

(51) Int. Cl.[7] .............................. B23B 7/00; B23B 9/00
(52) U.S. Cl. ............................ 82/117; 82/128; 82/129; 82/149
(58) Field of Search ..................... 82/117, 113, 128, 82/130, 131, 132, 149, 129, 107, 112, 114, 115, 116, 138, 142, 173

(56) References Cited

U.S. PATENT DOCUMENTS

| | | | | |
|---|---|---|---|---|
| 4,176,565 A | * | 12/1979 | Christoph | 82/1.2 |
| 4,327,613 A | * | 5/1982 | Melby | 82/128 |
| 4,359,917 A | * | 11/1982 | Wilger et al. | 82/128 |
| 5,056,389 A | * | 10/1991 | Johnstead | 82/128 |
| 5,655,278 A | * | 8/1997 | Harmand | 29/33 R |
| 5,660,093 A | * | 8/1997 | Ricci | 82/113 |
| 5,954,462 A | * | 9/1999 | Way et al. | 408/153 |
| 6,065,378 A | * | 5/2000 | Ricci | 82/128 |

* cited by examiner

*Primary Examiner*—Henry W. H. Tsai
(74) *Attorney, Agent, or Firm*—Wood, Phillips, Katz, Clark & Mortimer

(57) ABSTRACT

A machine tool assembly having a frame, a workpiece holder, and at least one machining unit that is operable to perform an operation on a workpiece in an operative position on the workpiece holder. The frame has first and second spaced end supports and at least one reinforcing element which extends between the first and second end supports so as to maintain the first and second end supports in a desired operative relationship. The workpiece holder and at least one machining unit each are connected to at least one of the first and second end supports and at least one reinforcing element so that the machining unit can be operated to perform an operation on a workpiece in an operative position on the workpiece holder.

53 Claims, 17 Drawing Sheets

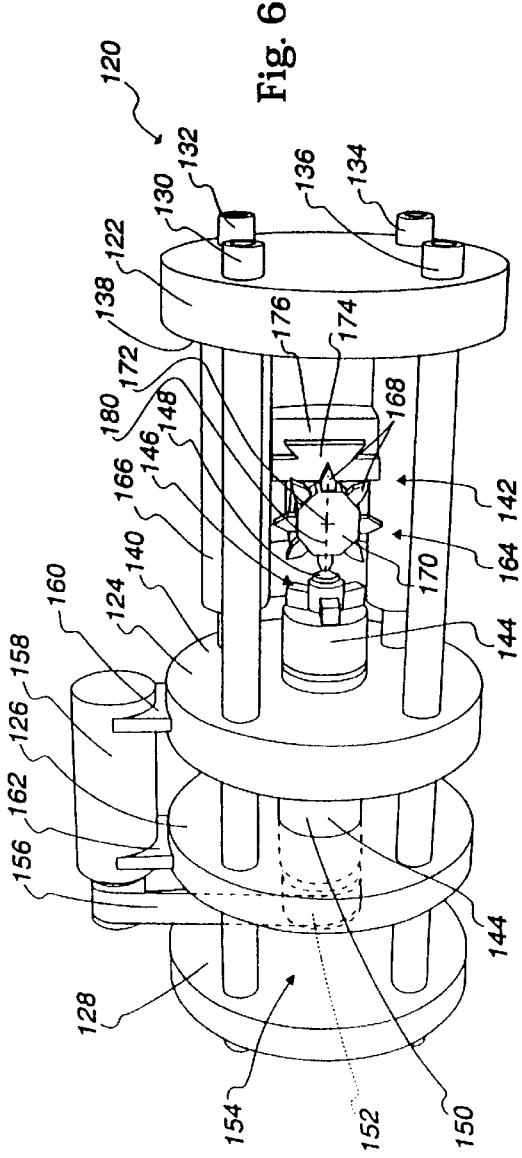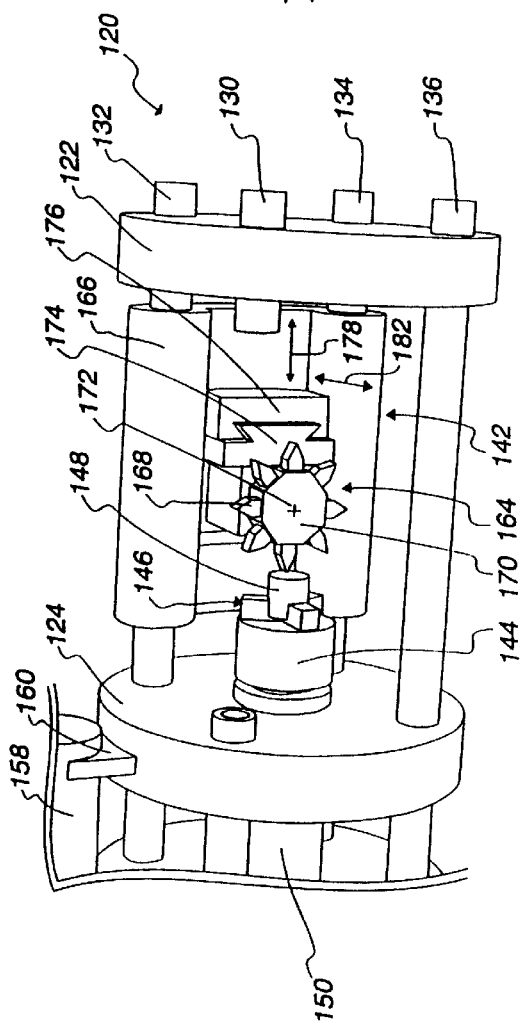

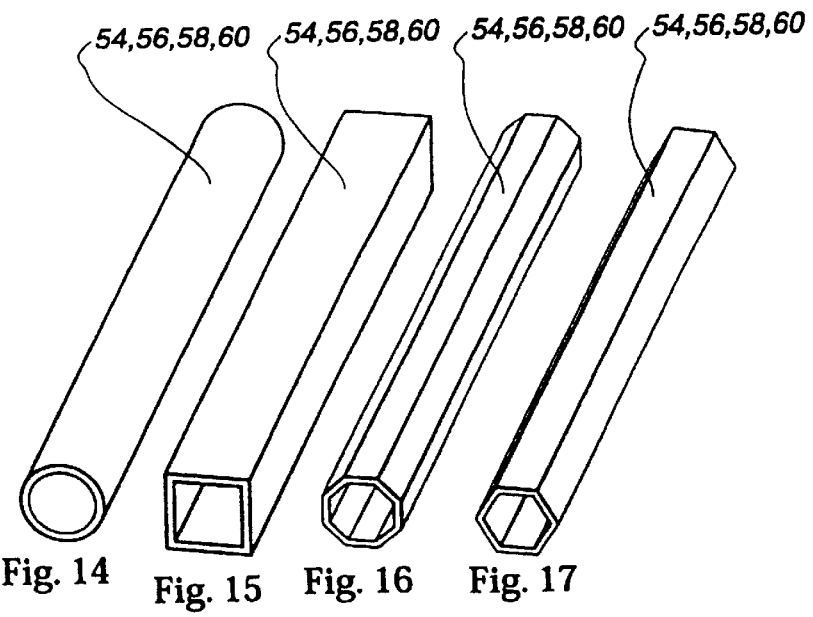
Fig. 14  Fig. 15  Fig. 16  Fig. 17
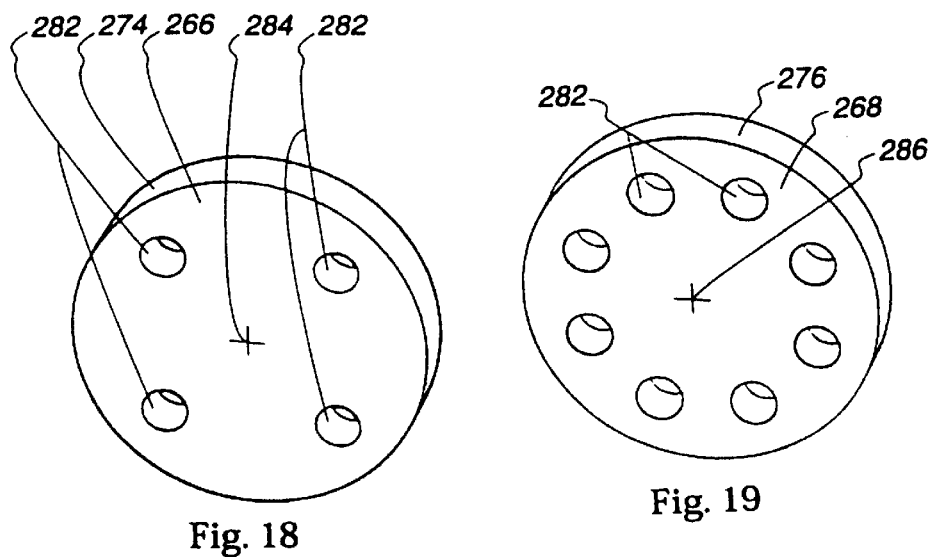
Fig. 18
Fig. 19
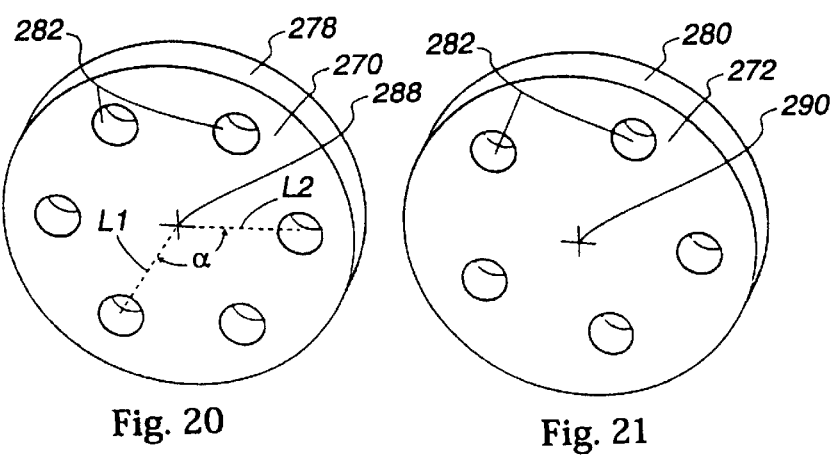
Fig. 20
Fig. 21

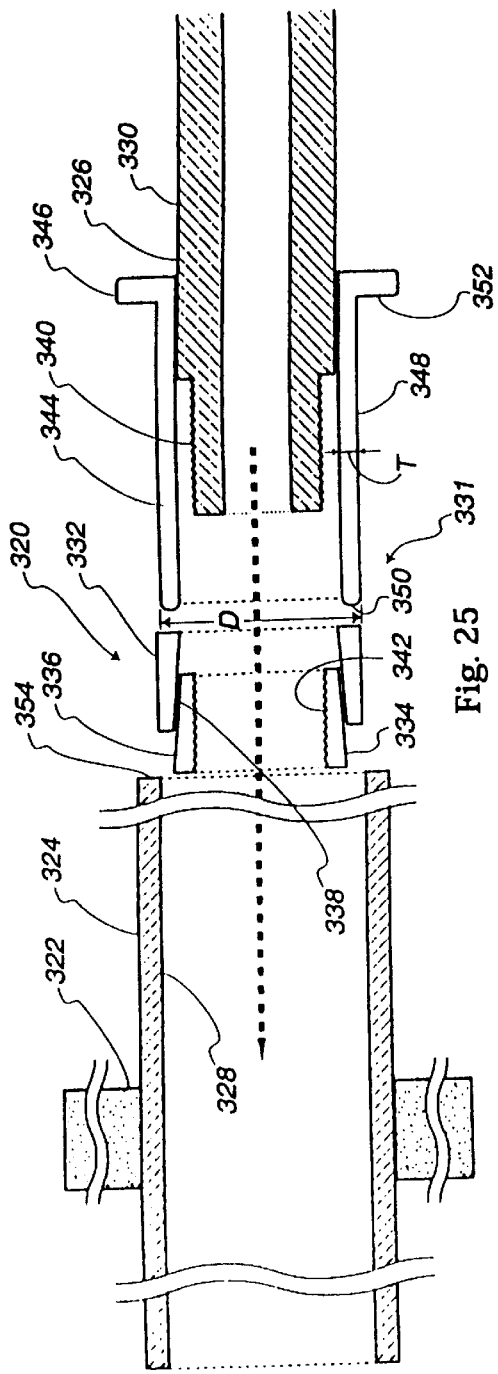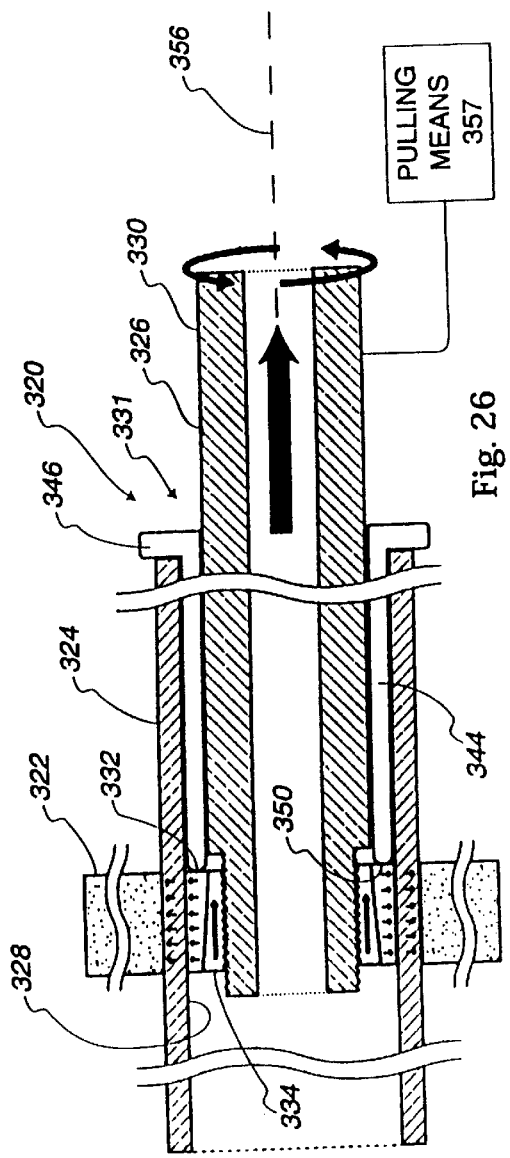

MACHINE TOOL ASSEMBLY

BACKGROUND OF THE INVENTION

1. Field of the Invention

This invention relates to machine tools and, more particularly, to a machine tool assembly that can be operated with the machine tool assembly in different orientations.

2. Background Art

Designers of machine tools attempt to achieve a number of different goals. First of all, accuracy is of utmost importance in the design of any machine tool. At the same time, it is desirable to make machine tools to have a relatively compact construction.

A conventional machine tool construction is shown in FIGS. 1–3 herein at 10. The machine tool 10 consists of a base 12 with an upper surface 14 supporting machine tool components, in this case a workpiece holder 16 and a machining unit 18, for performing a machining operation on a workpiece 20 on the workpiece holder 16.

In designing the base 12 forthe machine tool components 16,18, there are a number of considerations. First of all, the height of the upper surface 14 above the subjacent surface 22, as indicated by the double-headed arrow 24, is generally selected to match the waist height for an operator 28, as indicated by the double-headed arrow 26. Consequently, the base 12, by reason of this height requirement, has a substantial mass. Since the base 12 is commonly constructed from a heat conductive material, the larger the mass, the more heat retention there is during operations and the more the base becomes prone to thermally induced deformation. The potential deflection of spaced ends of the base 12, due to heating, is shown schematically in FIG. 3, as indicated by the dotted lines 12. Any base deformation potentially causes a misalignment of the cooperating workpiece holder 16 and machining unit 18, which may detract from the accuracy of any machining operation.

This conventional type of machine tool 10 is normally constructed by building the components thereof in a pyramidal-type fashion for stability. That is, inherently the overall stability of the machine tool 10 is established and maintained by stacking components, as indicated by the arrows 30, like building blocks of decreasing mass, from bottom to top. This construction is desired for stability in this type of system and is classified as an open loop system.

As seen in FIG. 3, an open loop system is one wherein the operating components and the base are not structurally contiguous. In FIG. 3, it can be seen that the machining unit 18 has a cantilevered working end 32 which operates on the workpiece 20 which is cantilever supported from the workpiece holder 16. Thus, the structural loop, as indicated by the arrows 34, is interrupted between the machining unit 18 and the workpiece holder 16. Consequently, any deformation of the base 12 may cause a relative repositioning of the workpiece holder 16 and machining unit 18 so as to potentially detract from the accuracy of any machining operation. Similarly, any movement of the workpiece holder 16 and machining unit 18 relative to each other and the base 12 may have the same consequences.

SUMMARY OF THE INVENTION

In one form, the invention is directed to a machine tool assembly having a frame, a workpiece holder, and at least one machining unit that is operable to perform an operation on a workpiece in an operative position on the workpiece holder. The frame has first and second spaced end supports and at least one reinforcing element which extends between the first and second end supports so as to maintain the first and second end supports in a desired operative relationship. The workpiece holder and at least one machining unit each are connected to at least one of the first and second end supports and at least one reinforcing element so that the machining unit can be operated to perform an operation on a workpiece in an operative position on the workpiece holder.

In one form, the first and second end supports have the form of a disk-shaped element, with the at least one reinforcing element having the shape of a first elongate bar.

The elongate bar may extend through at least one of the first and second end supports.

The frame may further include a second elongate bar, with each of the first and second elongate bars having a length, with the lengths of the first and second elongate bars being substantially parallel.

The frame may further include a third elongate bar.

The frame may further include a third disk-shaped element which is connected to the first elongate bar.

The at least one reinforcing element may be in the form of a first elongate plate.

The frame may include a second elongate plate which connects to the first and second end supports.

The first elongate bar may include first and second joinable parts.

The first and second joinable parts may be extendable, one within the other.

In one form, the first joinable part has an annular inside surface and the second joinable part has an annular outside surface with the at least one reinforcing element including a wedge assembly with a first wedge element between the annular inside surface of the first joinable part and the annular outside surface of the second joinable part.

The wedge assembly may further include a second wedge element between the annular inside surface of the first joinable part and the annular outside surface of the second joinable part.

The first and second wedge elements may act directly against each other.

The second wedge element may be threadably engaged with the second joinable part.

The wedge assembly may further include a wedge repositioning element which can be directed into the first joinable part to reposition at least one of the first and second wedge elements.

In one form, the first joinable part has an end and the wedge repositioning element has a shoulder which is abuttable to the end of the first joinable part to limit movement of the wedge repositioning element into the first joinable part.

The first elongate bar may have a through passageway.

A temperature controlling fluid may be directed through the passageway of the first elongate bar.

In one form, the first elongate bar has a cross-sectional configuration taken transversely to its length which is substantially circular.

This cross-sectional configuration may be non-circular or polygonal.

In one form, the first and second end supports each include a disk-shaped element with a perimeter edge defining substantially a circular shape.

The perimeter edges of the end supports may define a square shape.

In one form, the perimeter edges have spaced projections which may be bridged by a support upon which the machine tool assembly is placed.

The shape of the peripheral edges of the first and second end supports may be substantially the same.

In one form, the first and second end supports and at least one reinforcing element cooperatively define a caged working space within which a machining operation may be performed by the at least one machining unit.

In one form, the first and second end supports have first and second facing surfaces which bound a working space and the at least one machining unit is mounted on the first facing surface.

In one form, the first end support has oppositely facing first and second surfaces on the first and second opposite sides of the first end support and the workpiece holder is on the first side of the first end support and the at least one machining unit is on the second side of the first end support.

The first end support may have an opening through which a workpiece held by the workpiece holder can be directed to be operated upon by the at least one machining unit.

In one form, the frame, workpiece holder, and at least one machining unit define a machine tool module that can be operated in any orientation.

In one form, the frame defines a passageway for guiding movement of a temperature controlling fluid.

In one form, the at least one reinforcing element has a first elongate hollow bar, the frame has a second elongate hollow bar extending between the first and second end supports, and a passageway for temperature controlling fluid is defined through the first and second elongate hollow bars.

The passageway may be continuous to permit circulation of a temperature controlling fluid.

A pump may be provided for circulating temperature controlling fluid in the passageway.

The machine tool assembly may further include a temperature controlling fluid in the passageway.

The invention is also directed to the combination of a base and a first machine tool assembly that can be placed in an operative position on the base in an elevated position over a subjacent support surface, with the machine tool assembly having the configuration as described above.

The combination may further include a second machine tool assembly substantially the same as the first machine tool assembly that can be placed in an operative position on the base and in an elevated position over a subjacent support surface so that machining operations can be performed simultaneously by the first and second machine tool assemblies.

The base may define a reservoir for collection of workpiece particles and machining fluids generated during machining operations.

The base may have stepped surfaces for the first and second machine tool assemblies.

The end supports on the first and second machine tool assemblies may be supported directly against the base.

In one form, the at least one reinforcing element on the first and second machine tool assemblies does not directly engage the base.

The end supports on the first and second machine tool assemblies may each have a perimeter surface that is substantially circular.

Connectors may be provided for joining between the base and at least one of the end supports on each of the first and second machine tool assemblies to maintain the first and second machine tool assemblies in the operative position on the base.

The base may include a frame defining a plurality of compartments each configured to receive a machine tool assembly substantially the same as the first machine tool assembly.

The invention is further directed to a machine tool assembly having a frame, a workpiece holder, and at least one machining unit that is operable to perform an operation on a workpiece in an operative position on the workpiece holder. The frame defines a cage with an external surface which permits different portions of the external surface of the machine tool assembly module to be placed against a support surface to permit performance of a machining operation with the machine tool assembly module in different orientations.

In one form, the frame has a lengthwise axis and the external surface of the frame is configured to extend substantially fully around the lengthwise axis.

The frame may include first and second end supports and at least one reinforcing element which extends between the first and second end supports so as to maintain the first and second end supports in a desired operative relationship.

In one form, the frame has a central lengthwise axis and further includes a second reinforcing element which extends between the first and second end supports. First and second lines extending from the central axis to the first and second reinforcing elements define an included angle of at least 90°. In one form, this included angle is 120°.

In one form, the frame has a central lengthwise axis and includes a second reinforcing element which extends between the first and second end supports, with the first and second end supports each including an elongate bar, with the first and second elongate bars being diametrically oppositely situated relative to the elongate central axis.

In one form, the external surface of the cage has a rounded shape. Alternatively, the external surface could have a squared shape, a cylindrical shape, or other shapes.

BRIEF DESCRIPTION OF THE DRAWINGS

FIG. 6 is a view as in FIG. 4 of a modified form of machine tool assembly, according to the present invention;

FIG. 7 is an enlarged, fragmentary, perspective view of the machine tool assembly in FIG. 6 from substantially the same perspective as in FIG. 6;

FIGS. 14–17 are perspective views of different configurations for reinforcing elements on the inventive machine tool assemblies;

FIGS. 18–24 are perspective views of different configurations of end supports useable to make a frame for machine tool assemblies according to the present invention;

FIG. 25 is a fragmentary, cross-sectional view showing a two part reinforcing element that can be used to define frames for the inventive machine tool assemblies with first and second parts of the reinforcing elements in a pre-assembly position;

FIG. 26 is a view as in FIG. 25 with the first and second parts in assembled relationship;

DETAILED DESCRIPTION OF THE DRAWINGS

Figure 1:
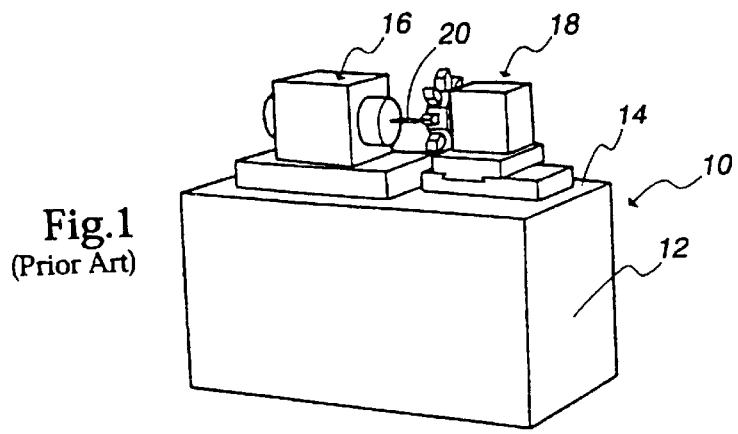
FIG. 1 is a perspective view of a conventional machine tool mounted upon a base.
Figure 2:
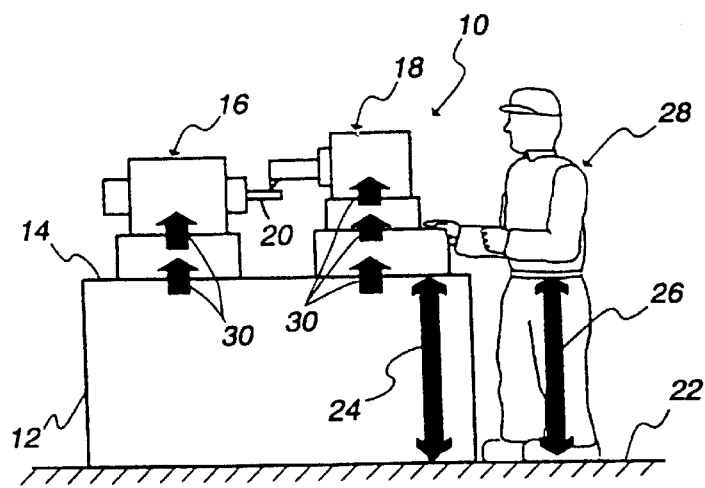
FIG. 2 is a side elevation of the machine tool assembly and base of FIG. 1.
Figure 3:
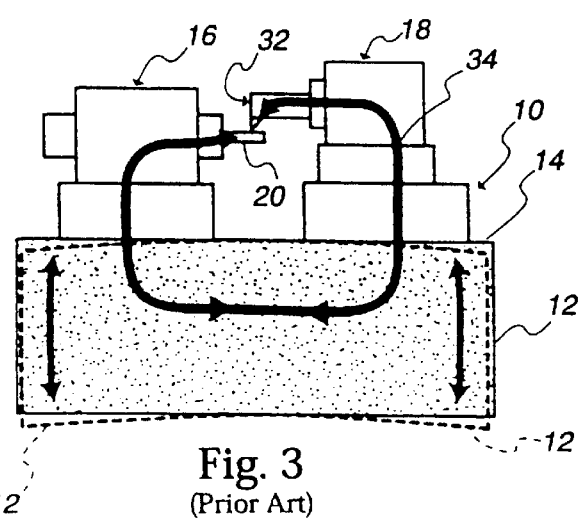
FIG. 3 is a view as in FIG. 2 and schematically showing deflection of the base that may occur under certain operating conditions.
Figure 4:
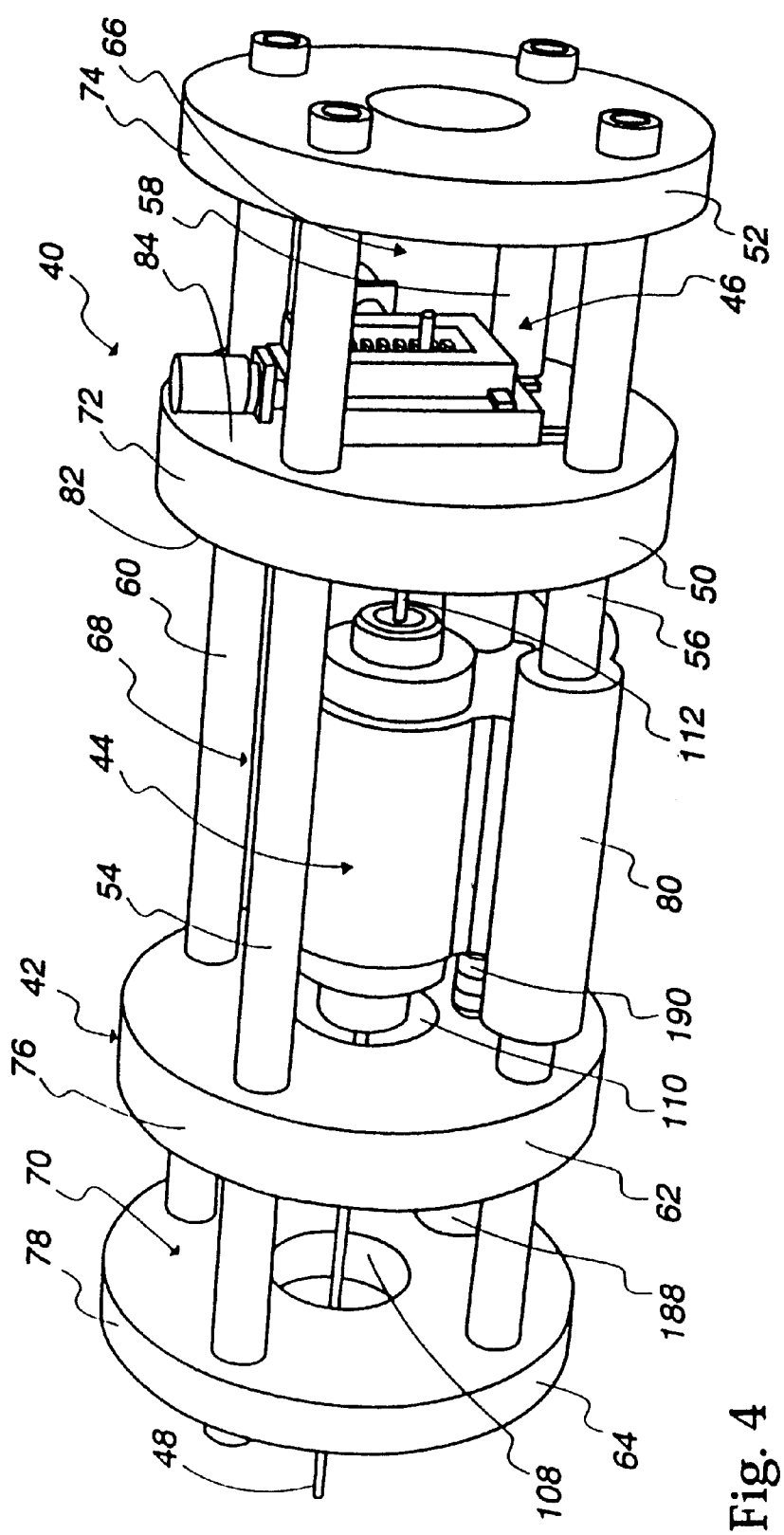
FIG. 4 is a perspective view of a machine tool assembly, according to the present invention, and consisting of a frame with end supports and reinforcing elements connecting between the end supports.
Figure 5:
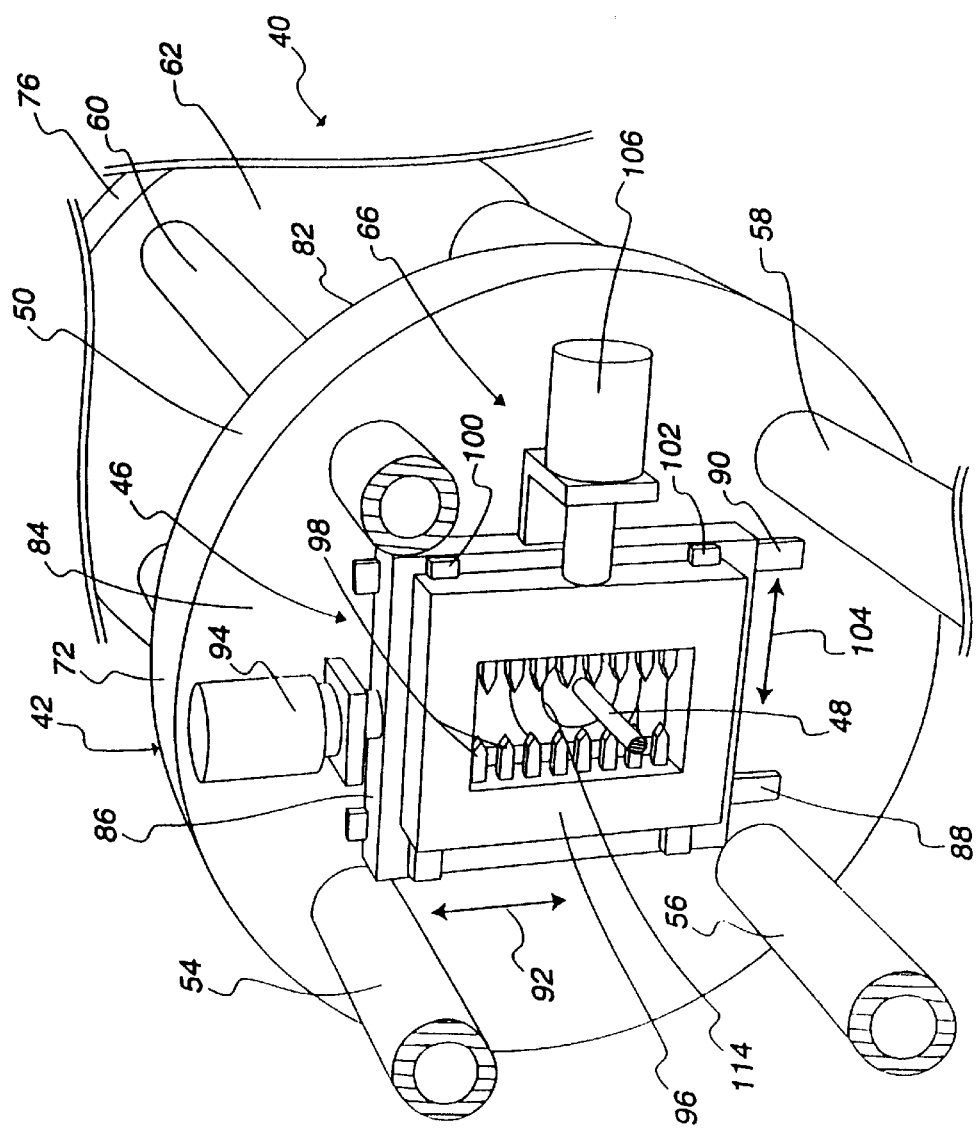
FIG. 5 is an enlarged, fragmentary, perspective view of one end of the machine tool assembly in FIG. 4.

Referring initially to FIGS. 4 and 5, one form of machine tool assembly, according to the present invention; is shown at 40. The machine tool assembly 40 consists of a frame 42 upon which a workpiece holder 44 and machining unit 46 are mounted. The machining unit 46 is operable to perform an operation on a workpiece 48 in an operative position on the workpiece holder 44.

As used herein, "workpiece holder" is intended to identify that structure which physically holds a workpiece during the performance of a machining operation. The workpiece holder may maintain the workpiece in a stationary position during a machining operation or move the workpiece, as in rotation around an axis. As used herein, "machining unit" is intended to identify that structure which holds a tool that performs an operation on a workpiece. The tool may be held in a stationary position relative to a moving workpiece, such as in a lathe environment, or may be moved, such as a boring element, relative to a stationary or moving workpiece. While specific machine tool components are shown herein for purposes of illustration, the inventive concept can be practiced with virtually any machine tool consisting of cooperating components, i.e. a workpiece holder and a machining unit.

The frame 42 consists of first and second spaced, disk-shaped end supports 50, 52 with at least one, and in this case four, reinforcing elements 54, 56, 58, 60 extending between the first and second end supports 50, 52 so as to maintain the first and second end supports 50, 52 in a desired operative relationship.

In this embodiment, there are third and fourth disk-shaped end supports 62, 64 between which the reinforcing elements 54, 56, 58, 60 extend so as to likewise maintain the third and fourth end supports 62, 64 in a desired operative relationship with each other and with the first and second end supports 50, 52.

While the reinforcing elements 54, 56, 58, 60 are shown as extending continuously between each of the first, second, third, and fourth end supports 50, 52, 62, 64, separate reinforcing elements may be used to connect as between only adjacent end supports 50, 52, 62, 64.

In this embodiment, adjacent end supports 50, 52; 50, 62; and 62, 64, in conjunction with the reinforcing elements 54, 56, 58, 60, define individual, caged spaces/compartments 66, 68, 70.

The overall arrangement of the end supports 50, 52, 62, 64 and reinforcing elements 54, 56, 58, 60 produces a caged module with good structural integrity so as to maintain positive alignment between the machine components thereon, in this case the workpiece holder 44 and machining unit 46. The structural integrity of the machine tool assembly module is attributable in part to the fact that a series of closed loops are defined throughout. For example, between the end supports 50, 62, there are three differently oriented closed loops associated with each of the reinforcing elements 54, 56, 58, 60. Exemplary reinforcing element 54 defines a first closed loop with the end supports 50, 62 and the reinforcing element 56, a second closed loop with the end supports 50, 62 and the reinforcing element 58, and third closed loop with the end supports 50, 62 and the reinforcing element 60.

In this embodiment, each of the end supports 50, 52, 62, 64 has a peripheral edge 72, 74, 76, 78, with each of the peripheral edges 72, 74, 76, 78 being substantially circular and of equal diameter. The end supports 50, 52, 62, 64 are connected so that the peripheral edges 72, 74, 76, 78 cooperatively produce an overall cylindrical shape.

In this embodiment, each reinforcing element 54, 56, 58, 60 is in the form of an elongate, hollow bar. However, the reinforcing elements 54, 56, 58, 60 could have a solid construction. In this embodiment, the length of the reinforcing elements 54, 56, 58, 60 are substantially parallel to each other and a central machining axis defined by the center of the workpiece 48, with the reinforcing elements 54, 56, 58, 60 extending fully through each of the end supports 50, 52, 62, 64. The reinforcing elements 50, 52, 62, 64 could be non-parallel depending upon the desired size and configuration of the space bounded thereby. The reinforcing elements 54, 56, 58, 60 can be fixed to each of the end supports 50, 52, 62, 64 by any suitable means, such as by welding, adhesive, threaded fasteners, or by means of structure described hereinafter.

The workpiece holder 44 is supported on the frame 42 through a base 80 which extends between and surrounds each of, the reinforcing elements 56, 58. Accordingly, additional closed loops are defined through the base 80 and each of the reinforcing elements 56, 58 and the end supports 50.

The end support 50 has oppositely facing surfaces 82, 84. The surface 84 defines a support for the machining unit 46. In this embodiment, the machining unit 46 consists of a base slide element 86 which is translatable along spaced, elongate guide rails 88, 90 selectively in opposite direction along a line indicated by the double-headed arrow 92. This movement is imparted by a drive motor 94. The base slide element 86 supports a second slide element 96 which carries a plurality of tools 98. The second slide element 96 is movable guidingly along elongate, parallel, guide rails 100, 102 selectively in opposite directions in a line indicated by the double-headed arrow 104, which is orthogonal to the line indicated by the arrow 92. Movement of the second slide element is imparted by a drive motor 106.

In this embodiment, the workpiece 48 is directed from a point of supply through an opening 108 through the end support 64, an opening 110 through the end support 62 and to and through the workpiece holder 44. A working end 112 of the workpiece 48 extends through an opening 114 through the end support 50 and through the slide elements 86, 96 so as to be exposed for the performance of a machining operation thereon.

The end supports 50, 52, 62, 64 are spaced from each other depending upon the required size for the particular space/compartment 66, 68, 70 and also depending upon the requirements for mounting surfaces to support different components of the particular machine tool assembly.

Figure 8:
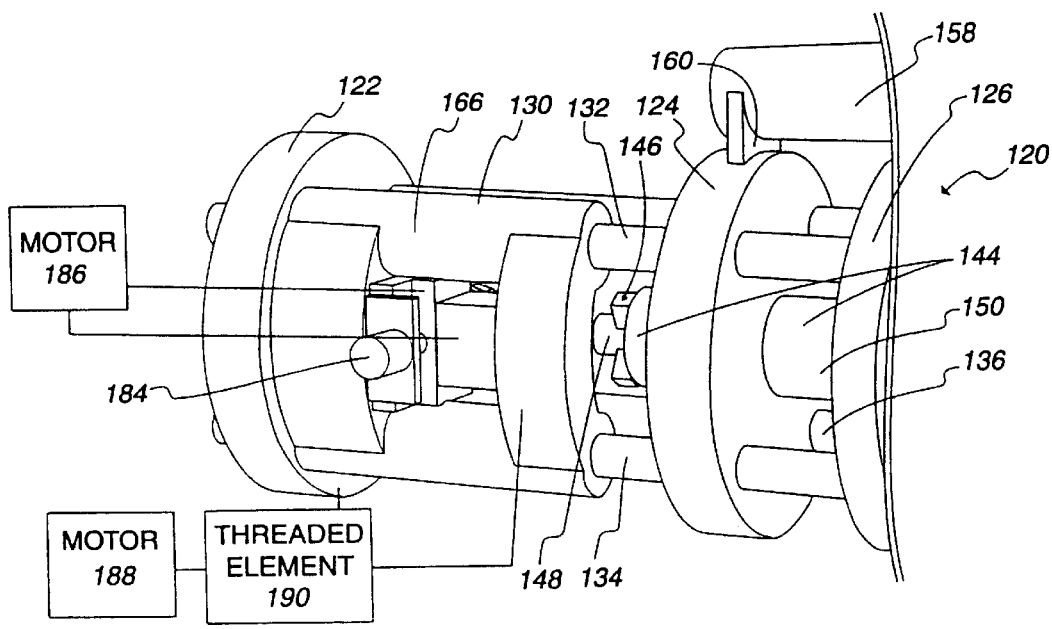
FIG. 8 is a fragmentary, perspective view of the machine tool assembly of FIGS. 6 and 7, taken from the side opposite that in FIGS. 6 and 7.

Another machine tool assembly, according to the present invention, and modified from that shown in FIGS. 4 and 5, is the machine tool assembly at 120 in FIGS. 6–8. The machine tool assembly 120 consists of first, second, third, and fourth disk-shaped end supports 122, 124, 126, 128 which are connected by an elongate, parallel, reinforcing elements 130, 132, 134, 136, each in the form of a hollow bar of circular cross section. Facing surfaces 138, 140 on the end supports 122, 124 bound a working space/compartment 142 within which a machining operation is performed on a workpiece.

A workpiece holder 144, in the form of a rotary spindle with a chuck 146 at its free end, supports a workpiece 148 for rotation thereof. The body 150 of the workpiece holder 144 is supported cooperatively by the end supports 124, 126 through which it extends. The workpiece holder 144 has a shaft 152 which projects into the space 154 between the end supports 126, 128 so as to be engagable by an endless belt 156 driven by a motor 158. The motor 158 has mounting elements 160, 162 which are spaced to attach one each to the end supports 124, 126.

A machining unit 164 is mounted upon a base 166 which surrounds, and spans between, each of the reinforcing elements 132, 134. A series of operating tools 168 is mounted upon a turret 170 for rotation about an axis 172 to selectively index desired tools into an active position. The turret 170 is carried on a first slide 174 which in turn is carried on a second slide 176 that is in turn slidably mounted to the base 166. The second slide 176 is translatable guidingly relative to the base 166 in the line of the double-headed arrow 178 and generally parallel to a rotary axis 180 for the chuck 146 and which defines the central axis for the machine tool assembly module 120. The first slide 174 is guided in translatory movement relative to the second slide 176 in a line indicated by the double-headed arrow 182, which is generally orthogonal to the line indicated by the arrow 178. A motor 184 may be operated to advance the first slide 174 along the axis 182. A separate motor 186 can be used to advance the second slide 176 relative to the base 166 in the line of the arrow 178.

It is also possible to reposition the turret 170 along the axis 180 by shifting the entire base 166, as through a separate motor 188. The motor 188 may operate a threaded element 190, as shown schematically in FIG. 8, and in FIG. 4 on the machine tool assembly 40, to translate the base 166 on the machine tool assembly 120 and the base 80 on the machine tool assembly 40.

Figure 9:
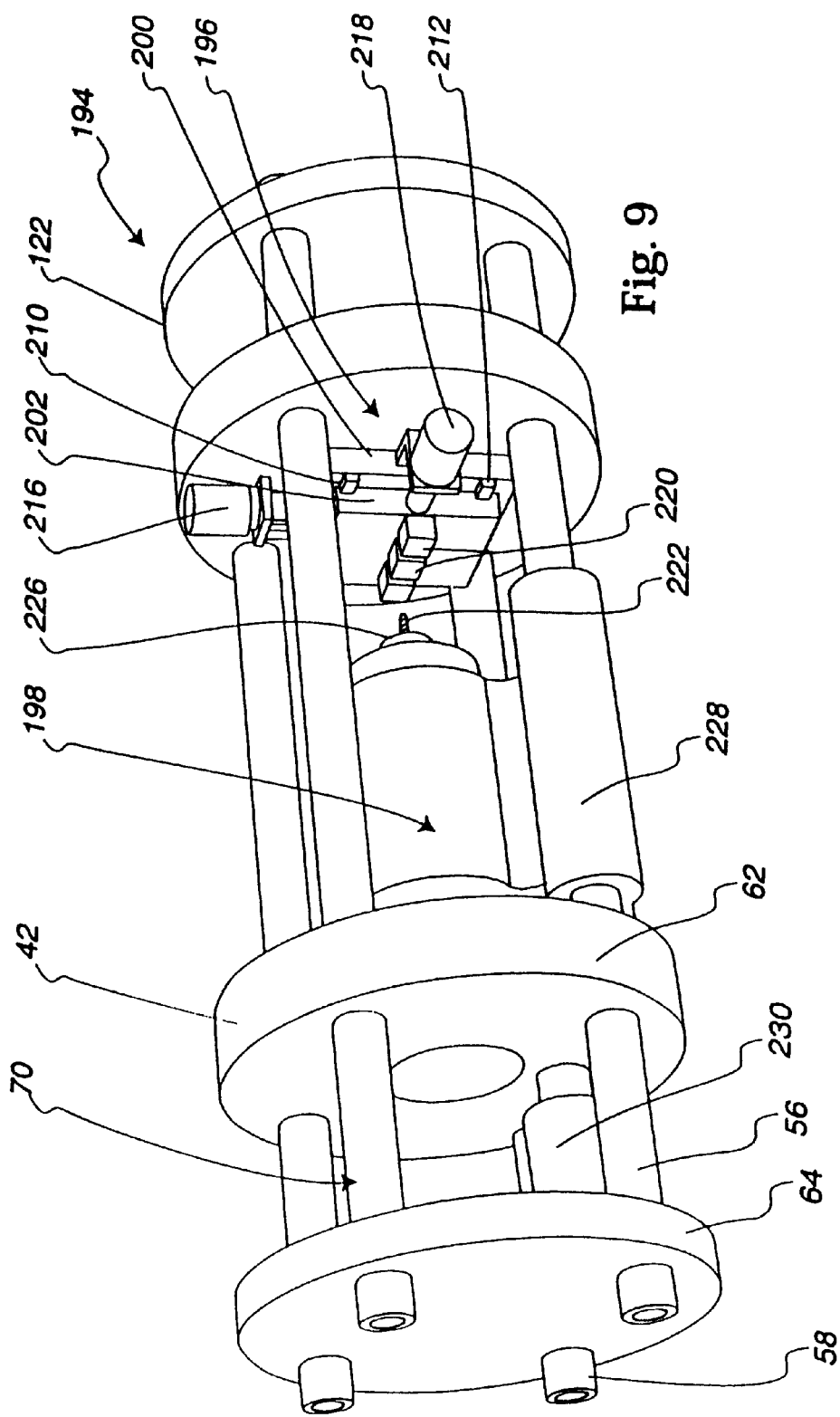
FIG. 9 is a perspective view of another modified form of machine tool assembly, according to the present invention.
Figure 10:
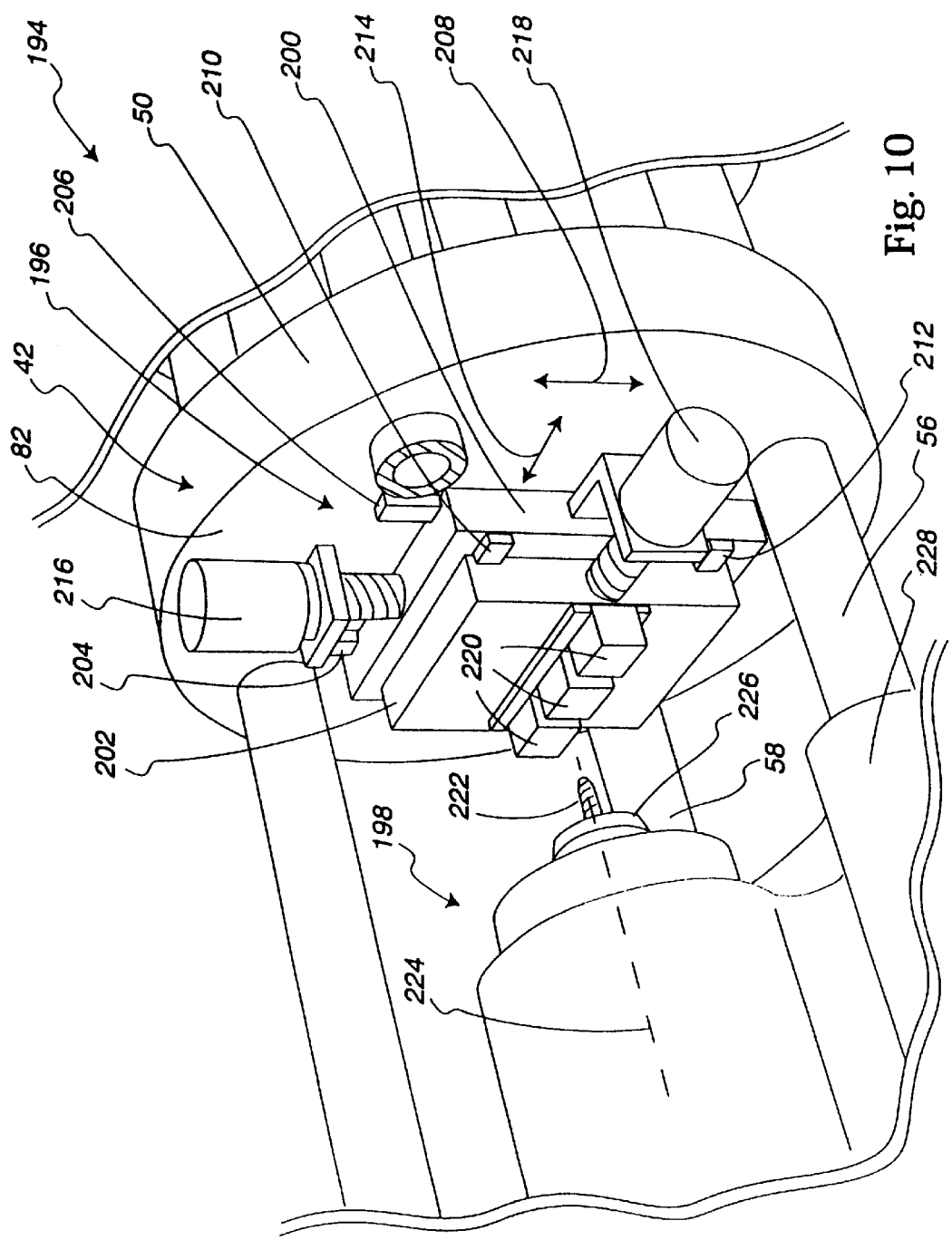
FIG. 10 is an enlarged, fragmentary, perspective view of machine tool components on one end of the machine tool assembly in FIG. 9.

In FIGS. 9 and 10, another modified form of machine tool assembly, according to the present invention, is shown at 194. The machine tool assembly 194 has a frame 42 that is the same as the frame 42 on the machine tool assembly 40, as shown in FIGS. 4 and 5. The difference lies in the construction and mounting locations for a workpiece holder 196 and machining unit 198.

The workpiece holder 196 consists of a base slide element 200 on the surface 82 of the end support 50, and a second slide element 202 carried by the base slide element 200. The base slide element 200 is movable guidingly along elongate, parallel rails 204, 206 in a line indicated by the double-headed arrow 208. The second slide element 202 is in turn guided in linear movement along elongate, parallel rails 210, 212 along a line indicated by the double-headed arrow 214, which line is orthogonal to the line identified by the double-headed arrow 208. Movement of the base slide element 200 is imparted by a motor 216, with movement of the second slide element 202 imparted by a motor 218. The second slide element 202 has a row of workpieces 220 which are selectively registrable with a tool 222 on the machining unit 198. The tool 222 is driven in rotation around an axis 224.

The machining unit 198 has a spindle 226 which is mounted on a base 228 that surrounds and bridges between the reinforcing elements 56, 58. The base 228 is slidable guidingly parallel to the central operating axis 224 along the reinforcing elements 56, 58, with movement being imparted by a motor 230 in the space/compartment 70 between the end supports 62, 64.

Figure 11:
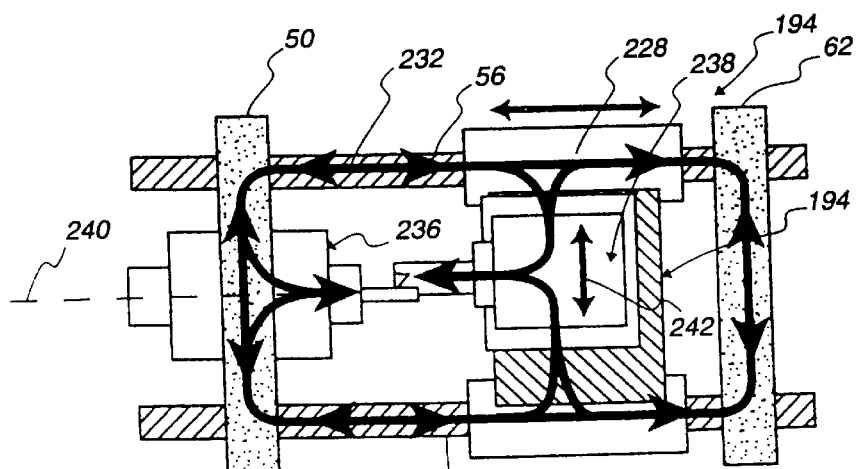
FIG. 11 is a schematic plan view of the machine tool assembly of FIGS. 9 and 10.

In FIG. 11, a schematic, plan view of the machine tool assembly 194 is shown with closed loops identified by the arrows 232. The machine tool assembly 194 in FIG. 11 is modified from that in FIG. 10 primarily by reason of different configuration of a workpiece holder 236, which extends fully through the end support 50. Closed loops are shown a) through the end support 50, the reinforcing element 56, the end support 62 and reinforcing element 58, b) through the end support 50, the reinforcing element 56, the base 228, and reinforcing element 58, and c) through the base 228, the reinforcing element 56, the end support 62, and the reinforcing element 58. The machining unit 198 is further modified from that shown in FIGS. 9 and 10 by reason of the fact that a part 238 of the machine tool assembly 198 is movable transversely to a central axis 240 of the workpiece holder 236, as indicated by the double-headed arrows 242.

Figure 12:
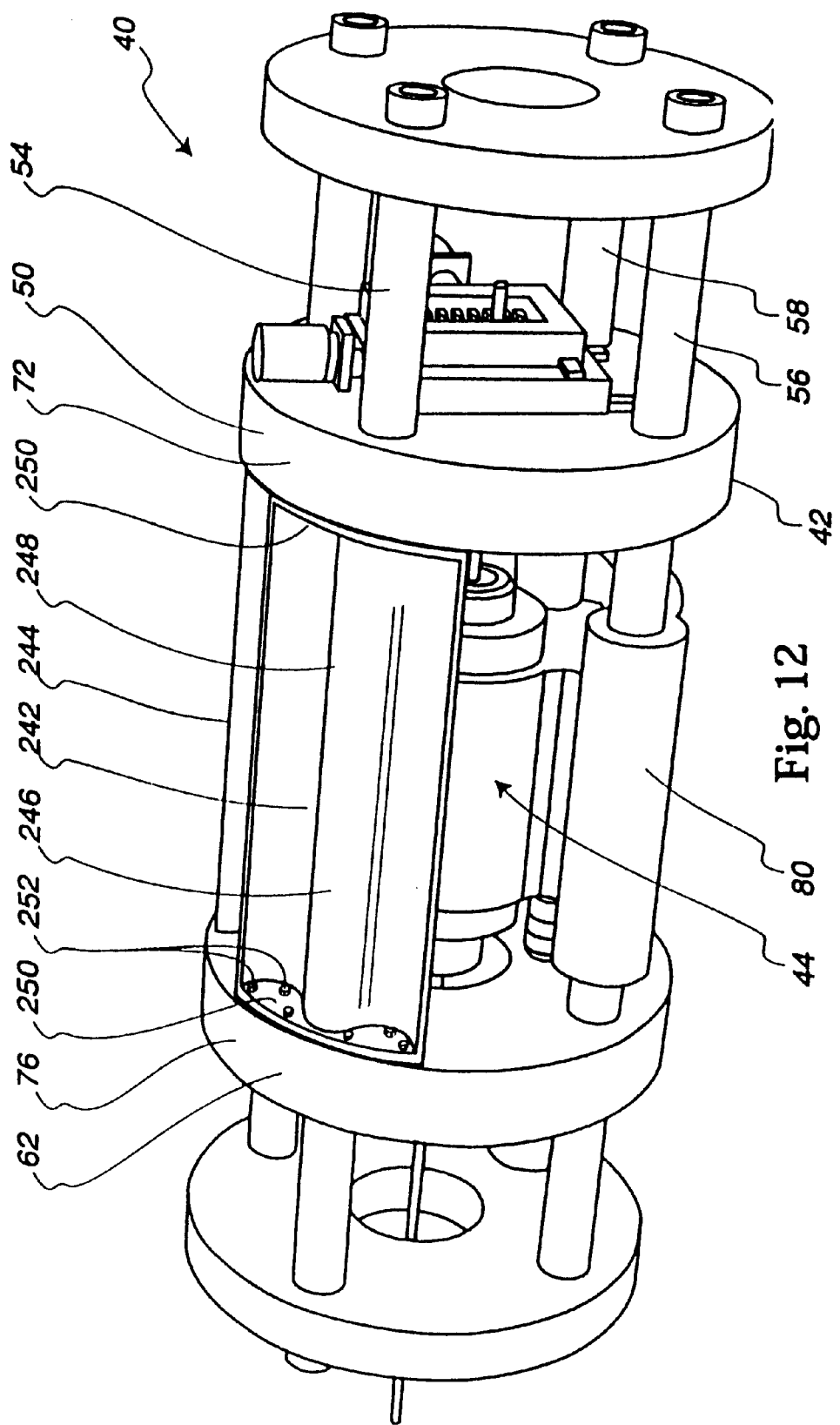
FIG. 12 is a perspective view of the machine tool assembly of FIGS. 9 and 10 modified by the use of one form of elongate reinforcing plate.

In FIG. 12, a modification to the machine tool 40 in FIGS. 4 and 5 is shown. The modification resides in the provision of additional, elongate, reinforcing elements 242, 244, each in the form of an elongate plate. Exemplary reinforcing element 242 has a body 246 with a W-shaped cross section taken transversely to its length. A central portion 248 of the body 246 wraps around the reinforcing element 54. End pieces 250 are integrally joined as part of the body 246 and facilitate attachment of the reinforcing element 242 to each of the end supports 50, 62. Threaded fasteners 252 are directed through the end pieces 250 into each of the end supports 50, 62. By configuring the body 246 as shown, the reinforcing element 244 can be constructed so as not to extend radially beyond the peripheral edges 72, 76 of the end supports 50, 62.

The reinforcing elements 242, 244 further rigidify the connection between the end supports 50, 62. While two such reinforcing elements 242 are provided, additional, like reinforcing elements might be incorporated in association with each of the reinforcing elements 56, 58, so long as they do not interfere with movement of the base 80 on the workpiece holder 44 relative to the frame 42.

Figure 13:
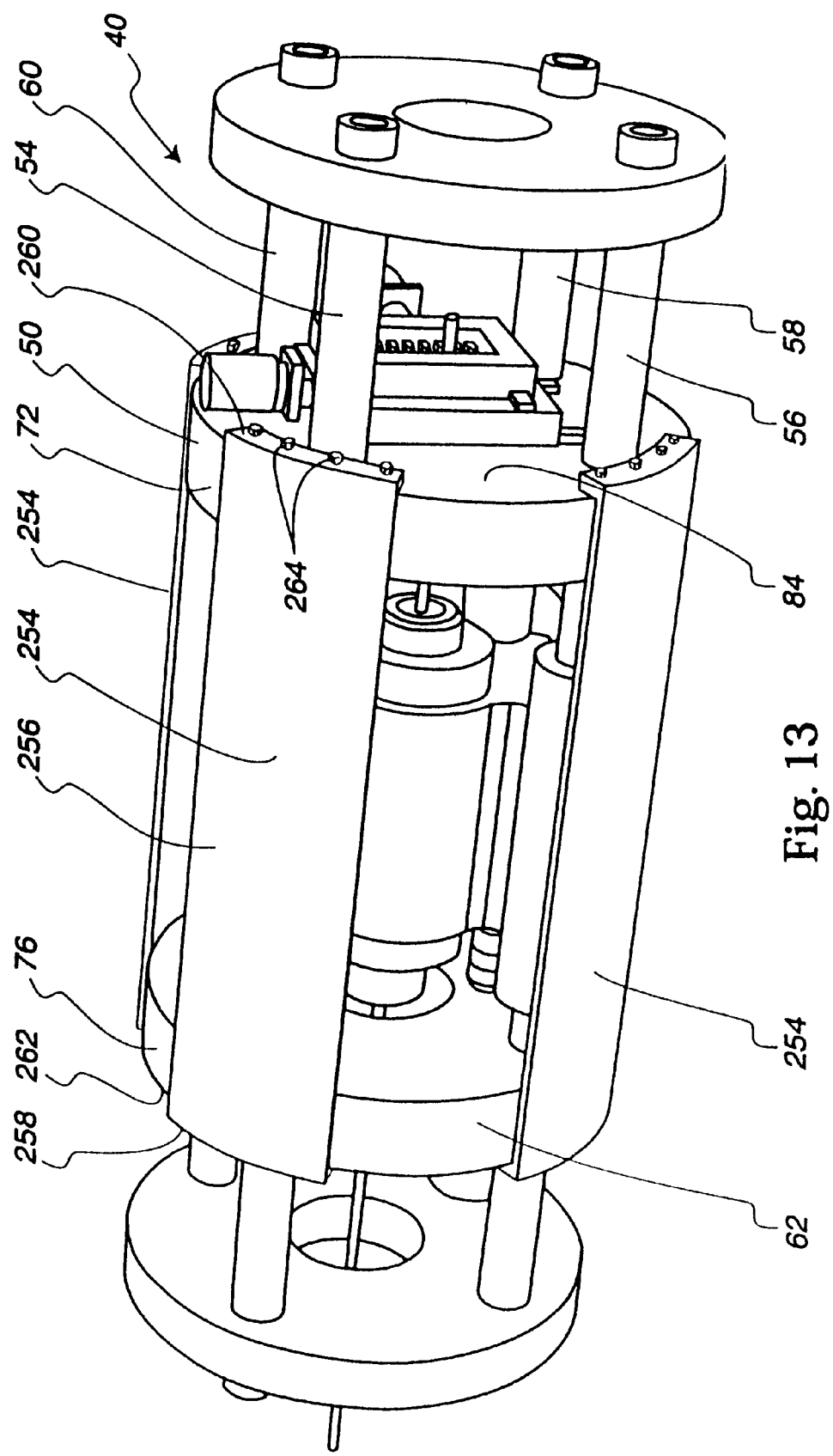
FIG. 13 is a view as in FIG. 12 showing a modified form of reinforcing plate.

In FIG. 13, a modified form of reinforcing plate 254 is shown on the machine tool 40, which can be substituted for, or used in conjunction with, the reinforcing elements 242, 244. Each reinforcing element 254 is in the form of an elongate plate. The plates 254 are placed against the peripheral edges 72, 76, one each at the location of the reinforcing elements 54, 56, 58, 60. Each reinforcing plate 254 has an elongate body 256 which is curved to the configuration of the peripheral edges 72, 76, and depending flanges 258, 260 at its opposite ends. The flanges 258, 260 are connected to oppositely facing surfaces 262, 84 on the end supports 62, 50, through threaded fasteners 264. The plates 254 further rigidify the overall structure of the machine tool assembly module 40.

In FIGS. 14–17, various different cross-sectional configurations for the reinforcing elements 54, 56, 58, 60 are shown. These configurations are only exemplary as other shapes might function equally effectively. In FIG. 14, a rounded cross-sectional shape, as in FIGS. 4–13, is shown. In FIG. 15, a square cross-sectional shape is shown, whereas in FIGS. 16 and 17, octagonal, and hexagonal cross-sectional shapes are shown. Other polygonal shapes can be utilized.

In FIGS. 18–24, various configurations of end supports, that might be substituted for the end supports 50, 52, 62, 64, are shown. Each of the end supports 266, 268, 270, 272 has a disk shape with round peripheral edges 274, 276, 278, 280. The end supports 266, 268, 270, 272 differ, each from the other, in terms of the number of through holes 282 formed therethrough to accommodate a like number of reinforcing elements 54, 56, 58, 60. In FIG. 18, four through holes 282 are formed, with eight, six, and five through holes 282 formed in the end supports 268, 270, 272 of FIGS. 19–21. The through holes 282 in each case are spaced equidistantly from their respective central axis 284, 286, 288, 290 and from each other circumferentially about the axes 284, 286, 288, 290.

As shown in FIG. 20, it is preferred that lines L1 and L2 extending from the central axis 288 through two different reinforcing elements through the through holes 282 define an included angle a of at least 90° to give the desired rigidity to the module and, more preferably, at least 120°. In this case, the diametrically opposite location of the through holes 282 contributes to the structural stability of the modules.

Figure 22:
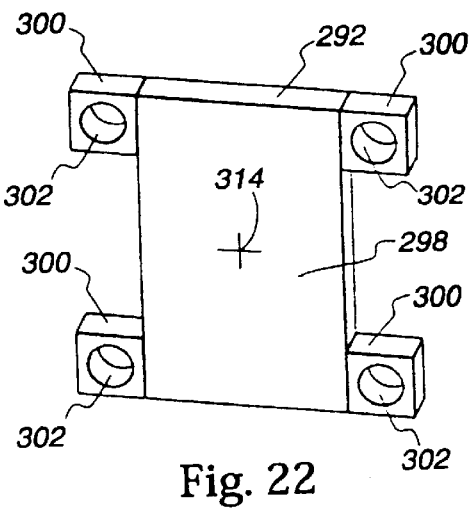
Figure 23:
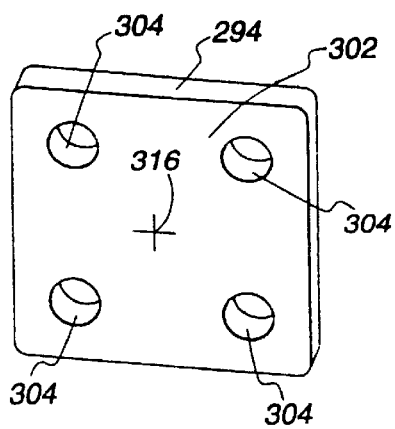
Figure 24:
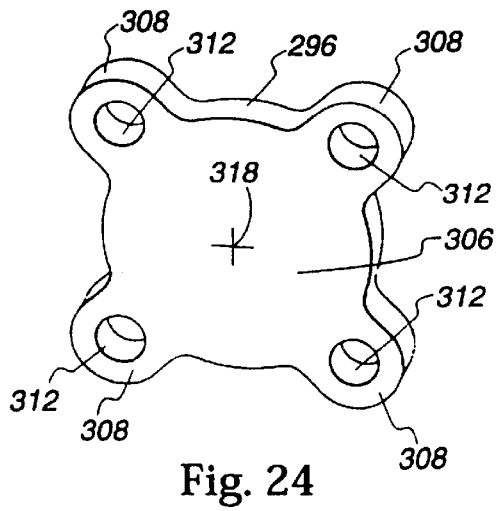

In FIGS. 22–24, three additional configurations for end supports are shown at 292, 294, 296, consecutively. The end support 292 has a rectangular body 298 with projections 300 at each of four corners of the body 298. Each projection has a throughhole 302 to accept a reinforcing element 54, 56, 58, 60.

The end support 294 has a square body 302 with through holes 304 adjacent each corner thereof.

The end support 296 has a round body 306 with integrally formed projections 308 equidistantly spaced around the peripheral edge 310 thereon. Each projection 308 has a through hole 312 formed therethrough to accept a reinforcing element 54, 56, 58, 60.

Each of the end supports 292, 294, 296 lends itself to being supported on a flat surface in four different orientations, each rotated through 90° relative to each other around the central axes 314, 316, 318 of the end supports 292, 294, 296, consecutively. This permits orientation of the machine tool assembly modules in at least the four different orientations and facilitates stacking, as hereinafter described.

Figure 27:
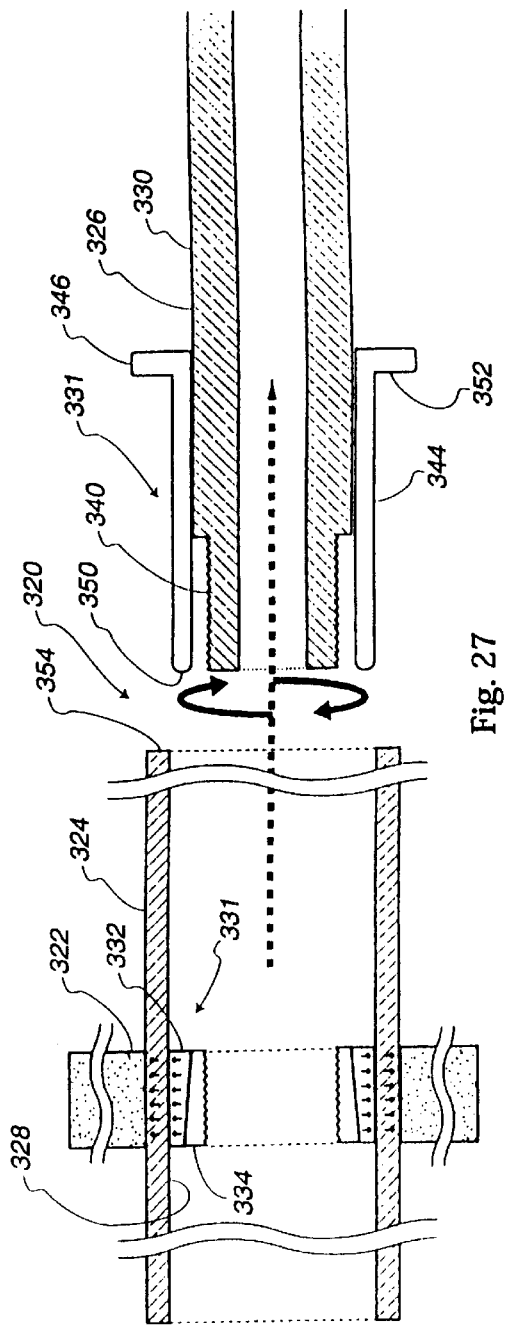
FIG. 27 is a view as in FIG. 26 with the first and second parts fully separated from each other.

While each of the reinforcing elements 54, 56, 58, 60 is shown as a single piece bar, each reinforcing element can be made in multiple parts, as shown for the elongate reinforcing element 320 in FIGS. 25–27. This multi-piece construction facilitates assembly to the end supports with one exemplary end support 322 shown in FIGS. 25–27 and corresponding in function to the end supports 50, 52, 62, 64. The reinforcing element 320 consists of a first part 324 and a second part 326 which is joinable to the first part 324. The first and second joinable parts 324, 326 are extendable, one within the other.

In this case, the second part 326 is extendable within the first part at 324, however this arrangement could be reversed. The first part 324 has an annular inside surface 328, with the second part having an annular outside surface 330.

The reinforcing element 320 further includes a wedge assembly 331 with first and second annular wedge elements 332, 334 which are assembled to be located between the inside surface 328 of the first part and the outside surface 330 of the second part 326. The second wedge element 334 fits inside of the wedge element 332 so that an outside cam surface 336 of the second wedge element 334 abuts to an inside cam surface 338 of the first wedge element 332. By moving the first wedge element 332 from right to left over the second wedge element 334, the combined effective diameter (D) of the wedge elements 332, 334 increases.

The second part 326 has a reduced diameter free end 340 which is threaded. The inside surface 342 of the second wedge element 334 has a complementary thread to that the reduced diameter free end 340 can be threaded into the second wedge element 334.

To join the parts 324, 326, the second wedge element 334 can be loosely threaded to the free end 340 with the first wedge element 332 in surrounding relationship. The second part 326 can then be advanced into the first part 324 to approximately the desired location. Relative movement of the wedge elements 332, 334 is accomplished by a wedge repositioning element 344, which element 344 is substantially cylindrical with an enlarged flange 346 at an end thereof. The diameters of the inside surface 328 and outside surface 330 and thickness T of an annular wall 348 on the wedge repositioning element 344, are chosen so that with the second part 326 advanced into the first part 324, a space exists between the outside surface 330 of the second portion 326 and the inside surface 328 of the first part 324 which is sufficient to relatively closely accept the wall 348 of the wedge repositioning element 344.

By advancing the wedge repositioning element 344 from right to left in FIGS. 25–27, a leading edge 350 of the wedge repositioning element 344 is abuttable to the first wedge element 332. Further advancement of the wedge repositioning element 344 causes the first wedge element 332 to shift from right to left over the second wedge element 334 to thereby tighten the connection between the first and second parts 324, 326. Movement of the wedge repositioning element 34 within the first part 324 is limited by an annular shoulder 352 which is abuttable to an edge 354 on the first part 324.

By reason of the threaded connection between the second part 326 and second wedge element 334, the second part 326 can be rotated about its central axis 356 to either further advance the second part 326 into the first part 324, or fully separate the second part 326 from the first part 324, depending upon the direction of rotation.

This structure also facilitates a positive securing of the parts 324, 326 by the performance of an additional step. In the FIG. 26 state, the second part 326 can be drawn by a pulling action to the right in that Figure to shift the second wedge element 334 to the right relative to the first wedge element 332, thereby enhancing the wedging force between the elements 332, 334. This pulling force may be imparted by any of a number of different means 357, i.e. hydraulic cylinder, etc. The wedge assembly 331 may be temporarily attached to the part 324 or otherwise blocked from left-to-right movement during this pulling step. The second part 326 may remain as part of the reinforcing element 320 in operation or may be removed, substituted for by another element of a desired size and shape, and reused in the manner described above.

The second part 326 threaded into the second wedge element 334 can be driven from right to left in FIG. 26 to disengage the wedge elements 332, 334.

Use of the reinforcing element 320 facilitates assembly of the reinforcing element to the end supports. A similar arrangement can be provided at each connection with an end support, i.e. at both ends of the reinforcing elements and at all intermediate connections between the reinforcing elements and end supports.

The above description is focused on the formation of a caged module using reinforcing elements and end supports. The same closed loop structural stability can be realized through other structures. As one example, in FIG. 28, a substantially fully enclosing frame 358 is shown with an internal chamber 360 to accommodate machine tool assembly components, including a workpiece holder 362 and a machining unit 364. With this arrangement, closed loops are formed substantially continuously around the central machining axis 366. The surrounding frame 358, in conjunction with the workpiece holder 362 and machining unit 364, defines a module that has structural stability and which can be operated in virtually every conceivable orientation.

Figure 28:
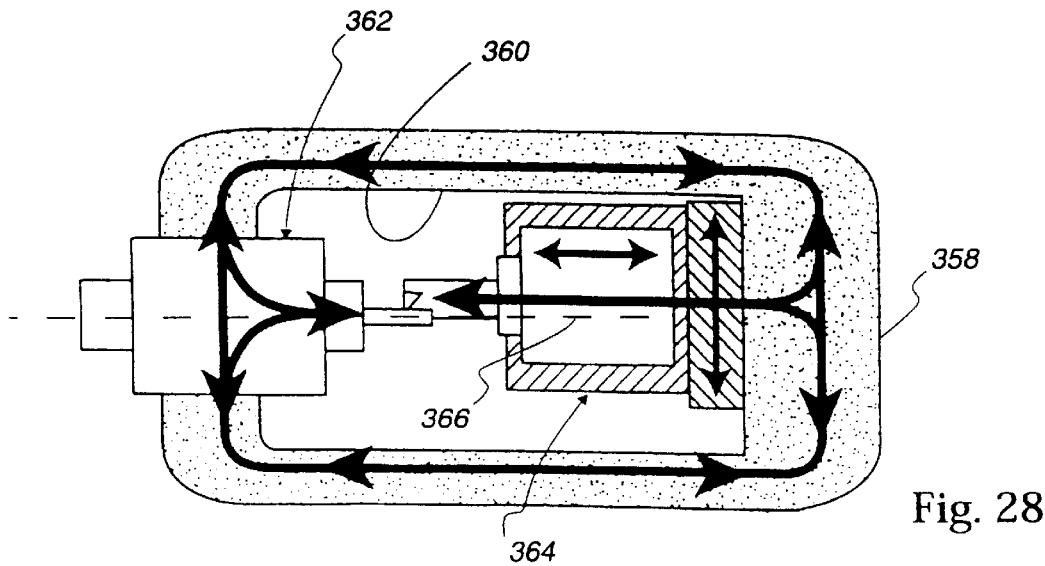
FIG. 28 is a schematic, plan view of a modified form of machine tool assembly according to the present invention including an encapsulating frame for machine tool assembly components.
Figure 29:
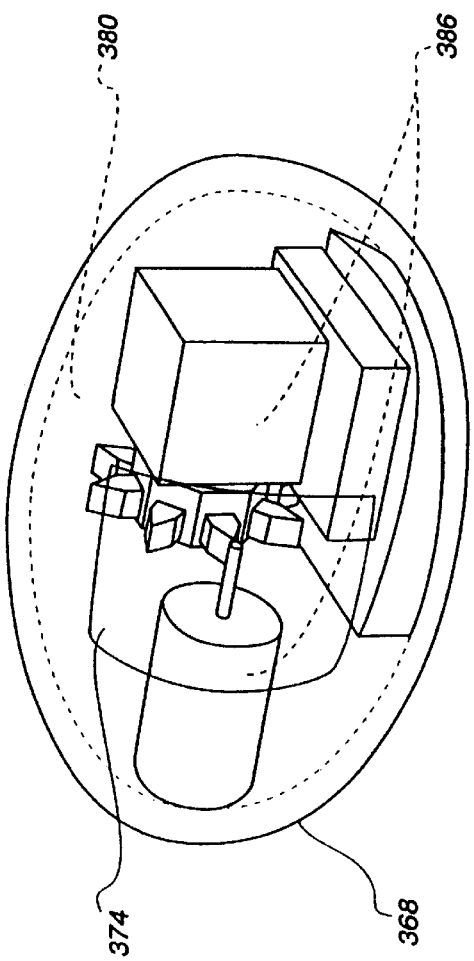
FIGS. 29–31 are perspective views of modified forms of encapsulating frames such as that in FIG. 28.
Figure 30:
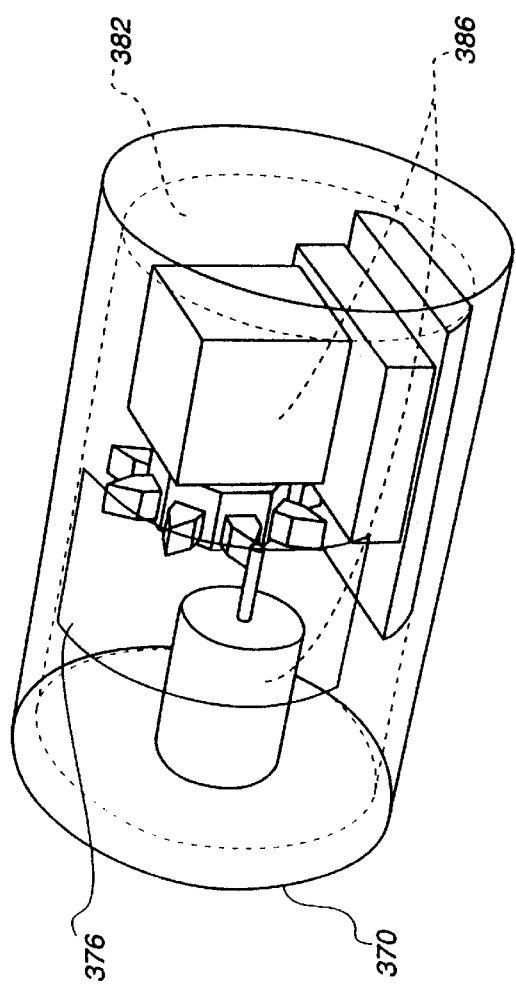
Figure 31:
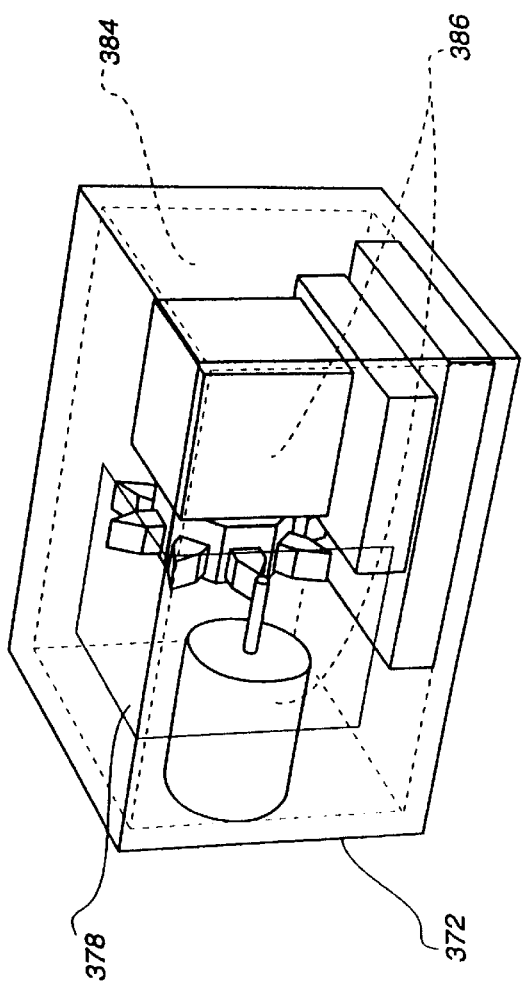

In FIGS. 29–31, different frame configurations using the principle of the frame 358 in FIG. 28 are shown. In FIG. 29, a generally rounded surrounding frame 368 is utilized with a cylindrical frame 370 shown in FIG. 30 and a squared/cubical frame 372 shown in FIG. 31. Access doors 374, 376, 378 may be used to access the internal chambers 380, 382, 384 to install the machine tool components identified generally at 386 and install and remove workpieces.

The completed machine tool assembly modules lend themselves to being used in different orientations and stacked to be simultaneously useable in a relatively compact space. Various setups for the exemplary machine tool assembly module 120 will now be described.

Figure 32:
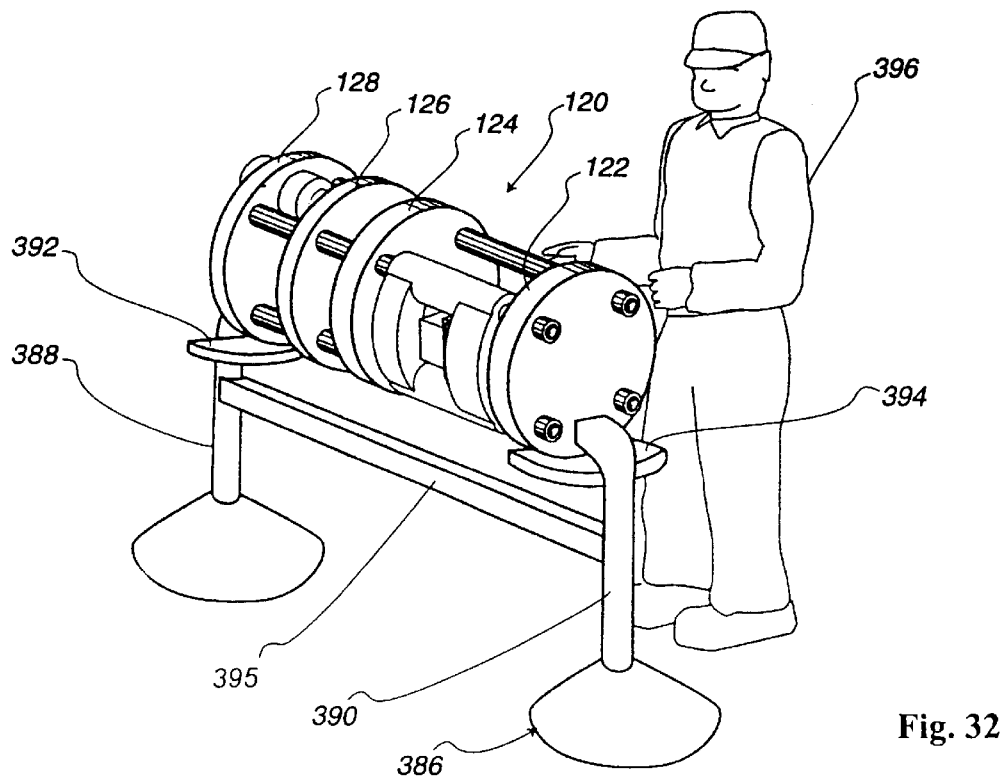
FIG. 32 is a perspective view of the machine tool assembly in FIGS. 6–8 mounted to one form of base.

In FIG. 32, the machine tool assembly 120 is mounted on a base 386 consisting of spaced upright 388, each of which defines an upwardly facing surface 392, 394. The uprights 388, 390 are maintained in a desired spaced relationship by a cross piece 394. The machine tool assembly module 120 can be rested upon the base 386 by situating the end support 128 on the surface 392 and the end support 122 on the surface 394. The uprights 388, 390 can be suitably connected to the end supports 128, 122 to prevent unwanted rotational movement of the machine tool assembly module on the base surfaces 392, 394.

With this arrangement, the structural integrity of the machine tool assembly is maintained as a module independently of the base. Thus, the base need not be made with a large mass to elevate the machine tool assembly 120 to the desired waist height of the operator 396. Accordingly, heat transferred to the base 386 is minimized. Even if the base 386 does distort, for any reason, this will not adversely affect the alignment of the machine tool components.

While the base 386 permits normal machining operations to be performed using the machine tool assembly 120 thereon, this base also facilitates setup or servicing of individual machine tool assemblies 120 that may be removed from an on line or active position. The individual machine tool assemblies 120 can be moved by a crane, or the like, between an active position and a temporary position on the base 386.

Figure 33:
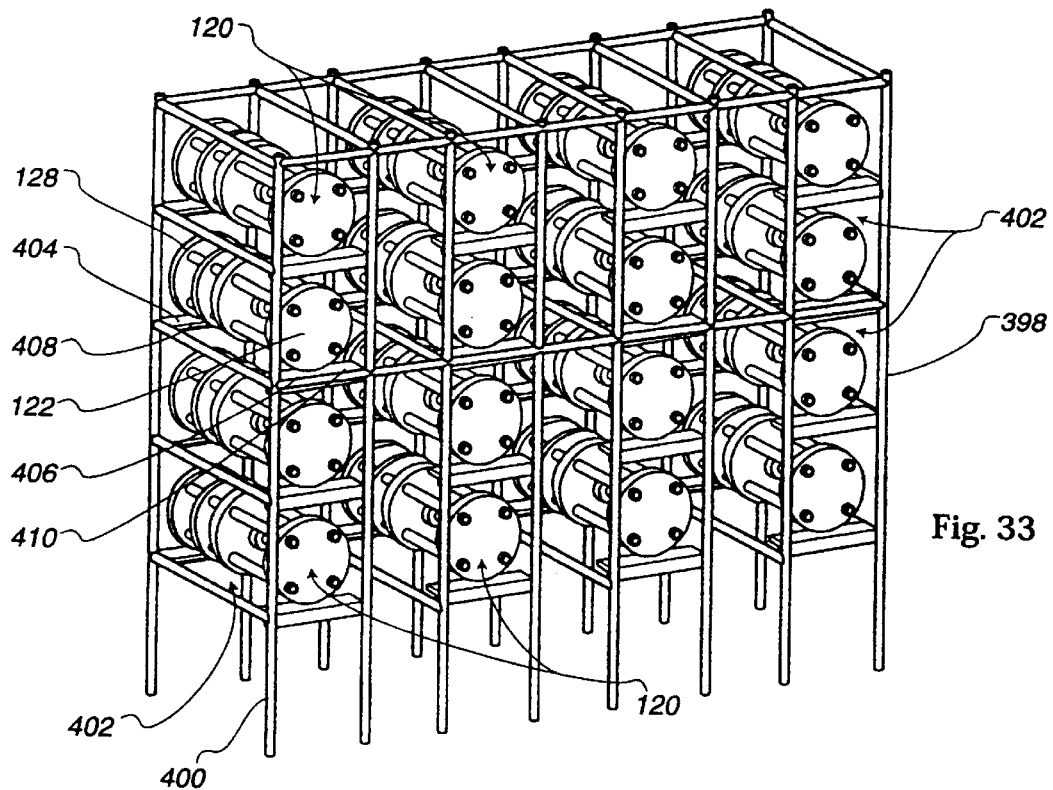
FIG. 33 is a perspective view of another form of base used to support a plurality of the inventive machine tool assemblies.

In FIG. 33, a base 398 is shown having bar-like components 400 joined to produce squared/cubical compartments 402 that are spaced from each other both horizontally and vertically. Compartments 402 are each sized to loosely receive one of the machine tool assembly modules 120. Within each compartment are end platforms 404, 406 defining upwardly facing surfaces 408, 410 to bear upon the end supports 128, 122 on the machine tool assembly module 120.

The base 398 can be set up to accept any number of different machine tool assembly modules 120 which can be operated simultaneously in the compartments 402. This utilizes space in a vertical direction that is often unused in many machining facilities.

Figures 34, 35:
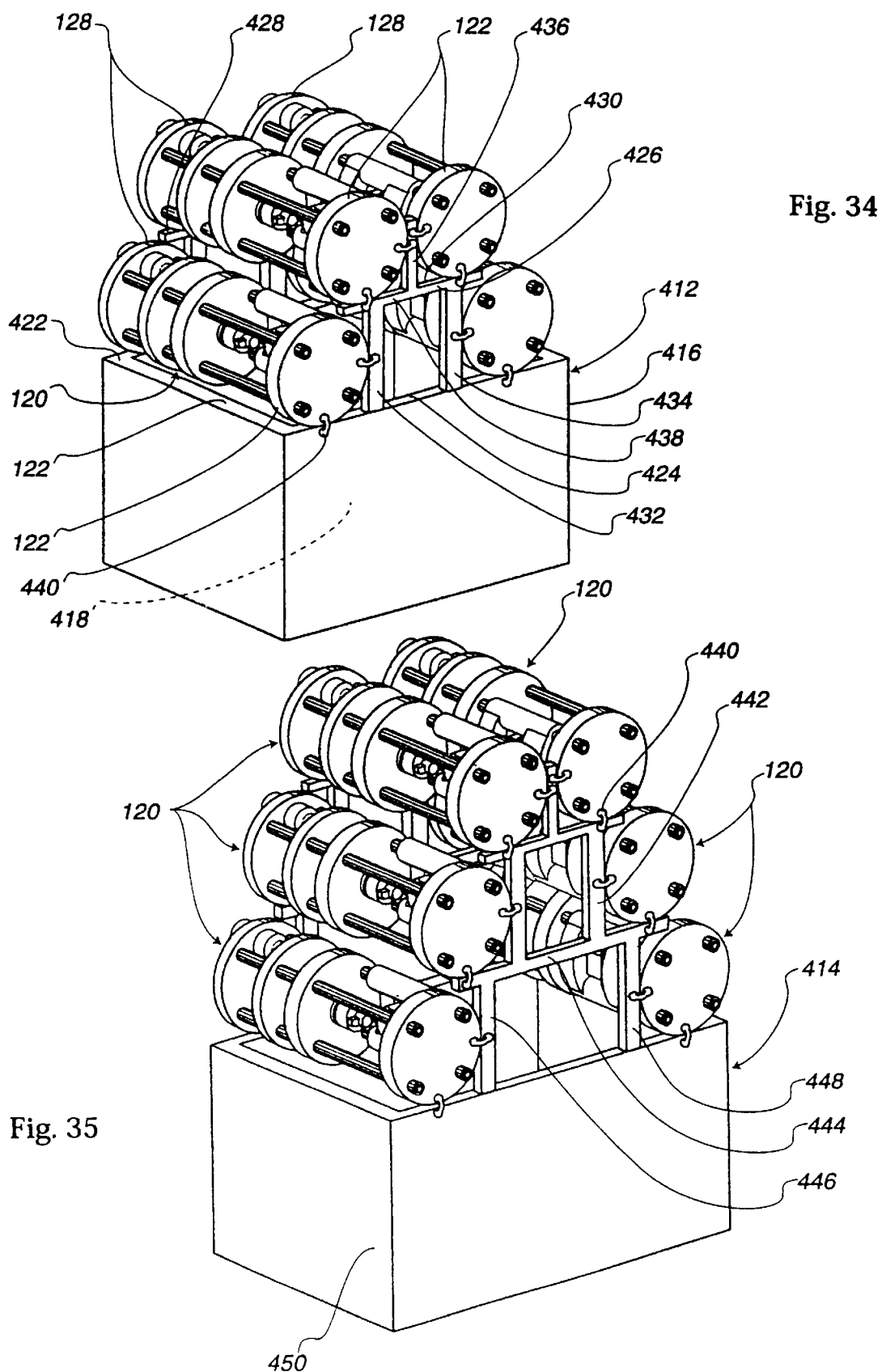
FIG. 34 is a perspective view of another form of base used to support a plurality of the inventive machine tool assemblies.
FIG. 35 is a perspective view of a still further form of base used to support a plurality of the inventive machine tool assemblies.

Further modified forms of bases are shown in FIGS. 34 and 35 at 412 and 414, respectively. The base 412 has a squared base portion 416 defining a reservoir 418 and an upwardly facing peripheral edge 420 extending around the reservoir 418 at the top of the base portion 412. Spaced, parallel edge portions 422, 424 are spaced a distance equal to the spacing between the end supports 122, 128 on the machine tool assembly module 120. Accordingly, the machine tool assembly module 120 can be supported through the end supports 122, 128 upon the edges 422, 424 and above the reservoir 418 so that lubricant and portions of workpieces removed during a machining operation can be collected in the reservoir 418.

The base includes inverted Y-shaped frames 426 which define spaced edges 428, 430 to bear on end supports 122, 128 to maintain additional machine tool assembly modules 120 in an operative position above those resting on the base edges 422, 424.

The frames 426 have uprights 432, 434, 436. The uprights 432, 434 support horizontal frame parts 438 which define the supporting edges 428, 430. The uprights 432, 434, 436 also define a foundation for connectors 440 which are usable to join the end supports 122, 128 to the base 412.

The base 412 thus defines a stepped arrangement for supporting machine tool assembly modules 120 in vertically spaced and horizontally staggered relationship so that machining fluids and workpiece particles removed during the machining operation can be accumulated within the reservoir 418 without being deposited on an underlying machine tool assembly module 120.

The base 414 in FIG. 35 is similar to the base 412 in FIG. 34, with the exception that frames 442, corresponding to the frames 426, have an additional "step" defined by an additional horizontal frame part 444 and additional, horizontally spaced uprights 446,448 for each frame part 444. The base part 450, corresponding to the base part 416, is dimensioned to accommodate the additional two machine tool assembly modules 120. The machine tool assembly modules 120 are assembled to the base 414 in the same manner and held in place by like connectors 440.

Figure 36:
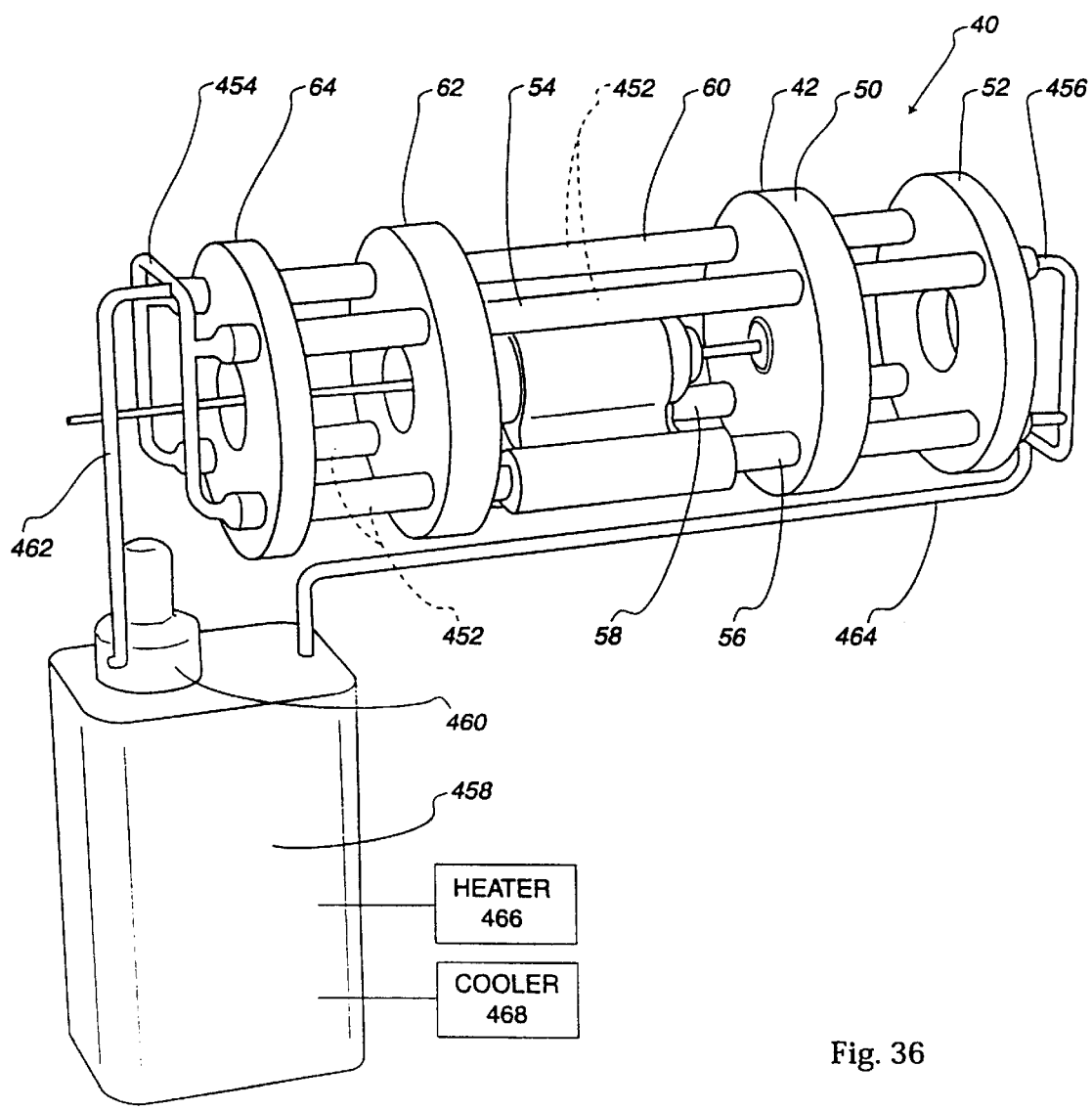
FIG. 36 is a perspective view of one of the inventive machine tool assemblies adapted so that cooling fluid can be continuously circulated therethrough.

Another aspect of the invention is shown in FIG. 36 using one of the exemplary machine tool assembly modules 40. Each of the reinforcing elements 54, 56, 58, 60 is shown with a hollow configuration so that each of the reinforcing elements 54, 56, 58, 60 has an internal passageway 452 defined therethrough.

According to the invention, separate manifolds 454,456 are mounted to the ends of the reinforcing elements 54, 56, 58, 60. A temperature controlling fluid from a supply 458 is delivered under pressure generated by a pump 460 through an inlet pipe 462, to the manifold 454 for distribution through each of the passageways 452 in the reinforcing elements 54, 56, 58, 60, and through the outlet manifold 456 to a return pipe 464 for delivery back to the supply 458. By operating the pump 460, a continuous circulation of temperature controlling fluid can be supplied through the reinforcing elements 54, 56, 58, 60. By reason of the contact between the reinforcing elements 54, 56, 58, 60 and the end supports 50, 52, 62, 64, temperature control of the entire frame 42 may be effected.

The temperature of the circulated fluid may be elevated at startup and may be cooled to lower the temperature of the system after running thereof. A fluid heater 466 and cooler 468 are provided and selectively operable to controllably raise and lower the temperature of the temperature controlling fluid.

The foregoing disclosure of specific embodiments is intended to be illustrative of the broad concepts comprehended by the invention.

What is claimed is:

1. A machine tool assembly comprising:
a frame;
a workpiece holder capable of grippingly engaging a workpiece; and
at least one machining unit that is operable to perform an operation on a workpiece in an operative position on the workpiece holder,
wherein the frame comprises first and second spaced end supports and at least one reinforcing element which extends between the first and second end supports and which can be fixed relative to the at least one reinforcing element so as to maintain the first and second end supports in a desired operative relationship,
the first and second spaced end supports respectively having first and second surfaces which face each other and bound a working space,
the workpiece holder and at least one machining unit each connected to at least one of the first and second end supports and at least one reinforcing element so that the at least one machining unit can be operated to perform a machining operation on a workpiece in an operative position on the workpiece holder,
the workpiece holder residing at least partially within the working space.

2. The machine tool assembly according to claim 1 wherein the first and second end supports each comprise a disk-shaped element and the at least one reinforcing element comprises a first elongate bar.

3. The machine tool assembly according to claim 2 wherein the first elongate bar extends through at least one of the first and second end supports.

4. The machine tool assembly according to claim 2 wherein the frame further comprises a second elongate bar, each of the first and second elongate bars has a length, and the lengths of the first and second elongate bars are substantially parallel.

5. The machine tool assembly according to claim 4 wherein the frame further comprises a third elongate bar.

6. The machine tool assembly according to claim 2 wherein the frame further comprises a third disk-shaped element which is connected, and can be fixed relative, to the first elongate bar.

7. The machine tool assembly according to claim 1 wherein the at least one reinforcing element comprises a first elongate bar having a length and a cross-sectional configuration transversely to the length of the first elongate bar that is substantially circular.

8. The machine tool assembly according to claim 1 wherein the first and second end support each comprise a disk-shaped element having a perimeter edge defining substantially a circular shape.

9. The machine tool assembly according to claim 1 wherein the first and second end support each comprise a disk-shaped element having a perimeter edge defining substantially a square shape.

10. The machine tool assembly according to claim 1 wherein the first and second end supports each comprise a disk-shaped element having a perimeter edge defining spaced projections which may be bridged by a support upon which the machine tool assembly is placed.

11. The machine tool assembly according to claim 1 wherein the first and second end support and at least one reinforcing element cooperatively define a caged working space within which a machining operation may be performed by the at least one machining unit.

12. The machine tool assembly according to claim 11 wherein the first and second end support have a peripheral edge with a shape and the shape of the peripheral edges of the first and second end support is substantially the same.

13. The machine tool assembly according to claim 1 wherein the at least one reinforcing element comprises a first elongate bar having a length and a cross-sectional configuration of the first elongate bar transversely to the length of the first elongate bar is polygonal.

14. A machine tool assembly comprising:
a frame;
a workpiece holder; and
at least one machining unit that is operable for performing an operation on a workpiece in an operative position on the workpiece holder,
wherein the frame comprises first and second spaced end supports and at least one reinforcing element which extends fully between and connects to each of the first and second end supports so as to maintain the first and second end supports in a desired operative relationship,
the workpiece holder and at least one machining unit each connected to at least one of the first and second end supports and at least one reinforcing element so that the at least one machining unit can be operated to perform a machining operation on a workpiece in an operative position on the workpiece holder,
wherein the first and second end supports each comprises a disk-shaped element and the at least one reinforcing element comprises a first elongate plate.

15. The machine tool assembly according to claim 14 wherein the frame further comprises a second elongate plate which connects to the first and second end supports.

16. A machine tool assembly comprising:
a frame;
a workpiece holder; and
at least one machining unit that is operable for performing an operation on a workpiece in an operative position on the workpiece holder,
wherein the frame comprises first and second spaced end supports and at least one reinforcing element which extends between the first and second end supports so as to maintain the first and second end supports in a desired operative relationship,
the workpiece holder and at least one machining unit each connected to at least one of the first and second end supports and at least one reinforcing element so that the at least one machining unit can be operated to perform a machining operation on a workpiece in an operative position on the workpiece holder,
wherein the at least one reinforcing element comprises a first elongate bar, and the first elongate bar comprises first and second joinable parts.

17. The machine tool assembly according to claim 16 wherein the first and second joinable parts are extendable one within the other.

18. The machine tool assembly according to claim 17 wherein the first joinable part has an annular inside surface and the second joinable part has an annular outside surface, the at least one reinforcing element comprises a wedge assembly comprising a first wedge element between the annular inside surface of the first joinable part and the annular outside surface of the second joinable part.

19. The machine tool assembly according to claim 18 wherein the wedge assembly further comprises a second wedge element between the annular inside surface of the first joinable part and the annular outside surface of the second joinable part.

20. The machine tool assembly according to claim 18 wherein the frame, workpiece holder, and at least one machining unit define a machine tool module that can be operated in any orientation.

21. The machine tool assembly according to claim 19 wherein the first and second wedge elements act directly against each other.

22. The machine tool assembly according to claim 21 wherein the second wedge element is threadably engaged with the second joinable part.

23. The machine tool assembly according to claim 21 wherein the wedge assembly further comprises a wedge repositioning element which can be directed into the first joinable part to reposition at least one of the first and second wedge elements.

24. The machine tool assembly according to claim 23 wherein the first joinable part has an end and the wedge repositioning element has a shoulder which is abuttable to the end of the first joinable part to limit movement of the wedge repositioning element into the first joinable part.

25. A machine tool assembly comprising:
a frame;
a workpiece holder; and
at least one machining unit that is operable for performing an operation on a workpiece in an operative position on the workpiece holder,
wherein the frame comprises first and second spaced end supports and at least one reinforcing element which extends between the first and second end supports so as to maintain the first and second end supports in a desired operative relationship,
the workpiece holder and at least one machining unit each connected to at least one of the first and second end supports and at least one reinforcing element so that the at least one machining unit can be operated to perform a machining operation on a workpiece in an operative position on the workpiece holder,
wherein the at least one reinforcing element comprises a first elongate bar having a through passageway to permit passage of a coolant through the first elongate bar.

26. A machine tool assembly:
a frame;
a workpiece holder;
at least one machining unit that is operable for performing an operation on a workpiece in an operative position on the workpiece holder,
wherein the frame comprises first and second spaced end supports and at least one reinforcing element which extends between the first and second end supports so as to maintain the first and second end supports in a desired operative relationship,
the workpiece holder and at least one machining unit each connected to at least one of the first and second end supports and at least one reinforcing element so that the at least one machining unit can be operated to perform a machining operation on a workpiece in an operative position on the workpiece holder,
wherein the at least one reinforcing element comprises a first elongate bar having a through passageway; and
a temperature controlling fluid that is directed through the passageway of the first elongate bar.

27. A machine tool assembly comprising:
a frame;
a workpiece holder; and
at least one machining unit that is operable for performing an operation on a workpiece in an operative position on the workpiece holder,
wherein the frame comprises first and second spaced end supports and at least one reinforcing element which extends between the first and second end supports so as to maintain the first and second end supports in a desired operative relationship,
the workpiece holder and at least one machining unit each connected to at least one of the first and second end supports and at least one reinforcing element so that the at least one machining unit can be operated to perform a machining operation on a workpiece in an operative position on the workpiece holder,
wherein the first and second end supports each comprises a disk-shaped element and the at least one reinforcing element comprises a first elongate bar,
wherein the first and second end supports respectively have first and second facing surfaces which bound a working space and the at least one machining unit is mounted to the first facing surface.

28. A machine tool assembly comprising:
a frame;
a workpiece holder; and
at least one machining unit that is operable for performing an operation on a workpiece in an operative position on the workpiece holder, wherein the frame comprises first and second spaced end supports and at least one reinforcing element which extends between the first and second end supports so as to maintain the first and second end supports in a desired operative relationship, the workpiece holder and at least one machining unit each connected to at least one of the first and second end supports and at least one reinforcing element so that the at least one machining unit can be operated to perform a machining operation on a workpiece in an operative position on the workpiece holder, wherein the first and second end supports each comprise a disk-shaped element and the at least one reinforcing element comprises a first elongate bar, wherein the first end support has oppositely facing first and second surfaces on first and second opposite sides of the first end support, the workpiece holder is on the first side of the first end support, and the at least one machining unit is on the second side of the first end support.

29. The machine tool assembly according to claim 28 wherein the first end support has an opening through which a workpiece held by the workpiece holder can be directed to be operated upon by the at least one machining unit.

30. A machine tool assembly comprising:

a frame;

a workpiece holder; and at least one machining unit that is operable for performing an operation on a workpiece in an operative position on the workpiece holder, wherein the frame comprises first and second spaced end supports and at least one reinforcing element which extends between the first and second end supports so as to maintain the first and second end supports in a desired operative relationship, the workpiece holder and at least one machining unit each connected to at least one of the first and second end supports and at least one reinforcing element so that the at least one machining unit can be operated to perform a machining operation on a workpiece in an operative position on the workpiece holder, wherein the frame defines a passageway for guiding movement of a temperature controlling fluid.

31. The machine tool assembly according to claim 30 wherein the at least one reinforcing element comprises a first elongate hollow bar, the frame further comprises a second elongate hollow bar extending between the first and second end supports, and the passageway is defined through the first and second elongate hollow bars.

32. The machine tool assembly according to claim 31 wherein the passageway is a continuous passageway which permits circulation of a temperature controlling fluid.

33. The machine tool assembly according to claim 31 further comprising a pump for circulating temperature controlling fluid in the passageway.

34. The machine tool assembly according to claim 33 further comprising a temperature controlling fluid in the passageway.

35. In combination:

a base; and a first machine tool assembly that can be placed in an operative position on the base in an elevated position over a subjacent support surface, said first machine tool assembly comprising:

a frame;

a workpiece holder;

at least one machining unit that is operable to perform an operation on a workpiece in an operative position on the workpiece holder, wherein the frame comprises first and second spaced end supports and at least one reinforcing element which extends between the first and second end supports so as to maintain the first and second end supports in a desired operative relationship, the workpiece holder and at least one machining unit each connected to at least one of the first and second end supports and at least one reinforcing element so that the at least one machining unit can be operated to perform an operation on a workpiece in an operative position on the workpiece holder; and a second machine tool assembly substantially the same as the first machine tool assembly that can be placed in an operative position on the base in an elevated position over a subjacent support surface so that machining operations can be performed simultaneously by the first and second machine tool assemblies.

36. The combination according to claim 35 wherein the base defines a reservoir for collection of particles of workpieces and machining fluids generated during machining operations.

37. The combination according to claim 35 wherein the base defines stepped surfaces for the first and second machine tool assemblies.

38. The combination according to claim 37 wherein the end supports of the first and second machine tool assemblies are supported directly against the base.

39. The combination according to claim 38 wherein the at least one reinforcing element on the first and second machine tool assemblies does not directly engage the base.

40. The combination according to claim 38 further comprising connectors joining between the base and at least one of the end supports on each of the first and second machine tool assemblies to maintain the first and second machine tool assemblies in the operative position on the base.

41. The combination according to claim 35 wherein the end supports on the first and second machine tool assemblies each have a peripheral edge that is substantially circular.

42. In combination:

a base; and a first machine tool assembly that can be placed in an operative position on the base in an elevated position over a subjacent support surface, said first machine tool assembly comprising:

a frame;

a workpiece holder; and at least one machining unit that is operable to perform an operation on a workpiece in an operative position on the workpiece holder, wherein the frame comprises first and second spaced end supports at least one reinforcing element which extends between the first and second end supports so as to maintain the first and second end supports in a desired operative relationship, the workpiece holder and at least one machining unit each connected to at least one of the first and second end supports and at least one reinforcing element so that the at least one machining unit can be operated to perform an operation on a workpiece in an operative position on the workpiece holder, wherein the base comprises a frame defining a plurality of compartments each configured to receive a machine tool assembly the same as the first machine tool assembly.

43. A machine tool assembly module comprising:

a frame;

a workpiece holder capable of grippingly engaging a workpiece; and at least one machining unit that is operable to perform an operation on a workpiece in an operative position on the workpiece holder, wherein the frame defines a cage with an external surface which is structurally reinforced to allow the machine tool assembly module to be supported on a base and operated with the base selectively bearing on a plurality of different portions of the cage which thereby permits different portions of the external surface of the machine tool assembly module to be placed against a support surface to permit performance of a machining operation with the machine tool assembly module in different orientations, wherein the frame comprises fixed facing surfaces bounding a working space and the workpiece holder resides at least partially within the working space.

44. The machine tool assembly module according to claim 43 wherein the frame has a lengthwise axis and the external surface of the frame is configured to extend substantially fully around the lengthwise axis.

45. The machine tool assembly module according to claim 44 wherein the frame comprises first and second end supports and at least one reinforcing element which extends between the first and second end supports so as to maintain the first and second end supports in a desired operative relationship.

46. The machine tool assembly module according to claim 43 wherein the frame comprises first and second end supports and at least one reinforcing element which extends between the first and second end supports so as to maintain the first and second end supports in a desired operative relationship.

47. The machine tool assembly module according to claim 46 wherein the frame has a central, lengthwise axis and further comprises a second reinforcing element which extends between the first and second end supports, and first and second lines extending from the central axis through the first and second reinforcing elements define an included angle of at least 90°.

48. The machine tool assembly module according to claim 46 wherein the frame has a central, lengthwise axis and further comprises a second reinforcing element which extends between the first and second end supports, and first and second lines extending from the central axis through the first and second reinforcing elements define an included angle of at least 120°.

49. The machine tool assembly module according to claim 46 wherein the frame has a central lengthwise axis and comprises a second reinforcing element which extends between the first and second end supports, the first and second end supports each comprising an elongate bar, and the first and second elongate bars are diametrically oppositely situated relative to the elongate central axis.

50. The machine tool assembly module according to claim 43 wherein the frame has a central, lengthwise axis, the external surface defines a rounded shape, and the machine tool assembly module can be operated with a support base bearing upon the external surface at any location on the surface around the central axis.

51. The machine tool assembly module according to claim 43 wherein the external surface defines a squared shape with flat surface portions and the machine tool assembly module can be operated with a support base bearing on any of the flat surface portions.

52. The machine tool assembly module according to claim 43 wherein the external surface defines a cylindrical shape.

53. A machine tool assembly module comprising:

a frame;

a workpiece holder; and at least one machining unit that is operable to perform an operation on a workpiece in an operative position on the workpiece holder, wherein the frame defines a cage with an external surface which is structurally reinforced and permits different portions of the external surface of the machine tool assembly module to be placed against a support surface to permit performance of a machining operation with different portions of the external surface of the cage on the machine tool assembly module bearing on the support surface, wherein the frame comprises facing surfaces spaced from each other along a first axis bounding a working space, wherein the machining unit is capable of driving a machining tool around a second axis substantially parallel to the first axis.

* * * * *